(12) United States Patent
Kung et al.

(10) Patent No.: US 11,962,622 B2
(45) Date of Patent: *Apr. 16, 2024

(54) AUTOMATED ENFORCEMENT OF SECURITY POLICIES IN CLOUD AND HYBRID INFRASTRUCTURE ENVIRONMENTS

(71) Applicant: FireEye Security Holdings US LLC, Milpitas, CA (US)

(72) Inventors: Lisun Joao Kung, Dallas, TX (US); Jose Renato Goncalves Santos, Morgan Hill, CA (US); Sarowar Golam Sikder, Carrollton, TX (US)

(73) Assignee: FireEye Security Holdings US LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,171

(22) Filed: Feb. 6, 2023

(65) Prior Publication Data
US 2023/0188571 A1   Jun. 15, 2023

Related U.S. Application Data

(63) Continuation of application No. 16/908,681, filed on Jun. 22, 2020, now Pat. No. 11,575,712, which is a
(Continued)

(51) Int. Cl.
*H04L 29/06* (2006.01)
*H04L 9/40* (2022.01)

(52) U.S. Cl.
CPC .......... *H04L 63/20* (2013.01); *H04L 63/0263* (2013.01); *H04L 63/101* (2013.01); *H04L 63/104* (2013.01)

(58) Field of Classification Search
CPC ... H04L 63/20; H04L 63/0263; H04L 63/101; H04L 63/104
See application file for complete search history.

(56) References Cited

U.S. PATENT DOCUMENTS 5,968,176 A * 10/1999 Nessett ................. H04L 63/02
726/11
6,460,141 B1   10/2002 Olden
(Continued)

FOREIGN PATENT DOCUMENTS

| CN | 101512510 A | 8/2009 |
| WO | 2018094516 A1 | 5/2018 |

OTHER PUBLICATIONS

Carman, David W., Peter S. Kruus, and Brian J. Matt. "Constraints and approaches for distributed sensor network security (final)." DARPA Project report, (Cryptographic Technologies Group, Trusted Information System, NAI Labs) 1.1 (2000): 1-39. (Year: 2000).*

(Continued)

*Primary Examiner* — Shawnchoy Rahman
(74) *Attorney, Agent, or Firm* — Hanley, Flight & Zimmerman, LLC

(57) ABSTRACT

To prevent un-authorized accesses to data and resources available in workloads on an organization's or enterprise's computer network, various improvements to automated computer network security processes to enable them to enforce network security policies using native network security mechanisms to control communications to and/or from workload units of applications running on different nodes within hybrid computer network infrastructures having both traditional hardware resources and virtual resources provided by private and public cloud infrastructure services.

18 Claims, 12 Drawing Sheets

Related U.S. Application Data continuation of application No. 15/878,386, filed on Jan. 23, 2018, now Pat. No. 10,721,275.

(60) Provisional application No. 62/477,376, filed on Mar. 27, 2017, provisional application No. 62/450,001, filed on Jan. 24, 2017, provisional application No. 62/449,571, filed on Jan. 23, 2017.

(56) References Cited

U.S. PATENT DOCUMENTS

| | | | |
|---|---|---|---|
| 8,074,256 | B2 | 12/2011 | Valente |
| 8,264,978 | B1 | 9/2012 | Srinivas |
| 8,516,575 | B2 | 8/2013 | Burnside |
| 9,716,617 | B1 | 7/2017 | Ahuja |
| 10,057,356 | B2 | 8/2018 | Sherman |
| 10,298,720 | B1 | 5/2019 | Miller |
| 10,439,897 | B1 * | 10/2019 | Komarla ............... G06F 3/067 |
| 10,721,275 | B2 | 7/2020 | Kung et al. |
| 11,575,712 | B2 | 2/2023 | Kung et al. |
| 2003/0126464 | A1 | 7/2003 | McDaniel |
| 2003/0161265 | A1 | 8/2003 | Cao |
| 2006/0074876 | A1 * | 4/2006 | Kakivaya ............... G06F 16/10 |
| 2010/0262717 | A1 * | 10/2010 | Critchley ........... H04L 67/1065 |
| | | | 709/251 |
| 2012/0011560 | A1 | 1/2012 | Natarajan |
| 2013/0139244 | A1 * | 5/2013 | Blaich .................. G06F 21/629 |
| | | | 726/11 |
| 2016/0142963 | A1 | 5/2016 | Salkintzis |
| 2016/0314491 | A1 | 10/2016 | Shani |
| 2017/0048253 | A1 * | 2/2017 | Anton .................... H04L 63/20 |
| 2019/0319926 | A1 | 10/2019 | Cummins |

OTHER PUBLICATIONS

Basin, David, Jürgen Doser, and Torsten Lodderstedt. "Model driven security: From UML models to access control infrastructures." ACM Transactions on Software Engineering and Methodology (TOSEM) 15.1 (2006): 39-91. (Year: 2006).*

Ngo, Canh, Yuri Demchenko, and Cees de Laat. "Multi-tenant attribute-based access control for cloud infrastructure services." Journal of information security and applications 27 (2016): 65-84. (Year: 2016).

Macdonald, Neil, et al., "How to Make Cloud IaaS Workloads More Secure Than Your Own Data Center," http://www.gartner.com/home, ID G00300337, published Jun. 24, 2016, 14 pages.

United States Patent and Trademark Office, "Non-Final Office Action", issued in connection with U.S. Appl. No. 15/878,386, dated Nov. 12, 2019, 12 pages.

United States Patent and Trademark Office, "Notice of Allowance", issued in connection with U.S. Appl. No. 15/878,386, dated Mar. 3, 2020, 9 pages.

United States Patent and Trademark Office, "Supplemental Notice of Allowability", issued in connection with U.S. Appl. No. 15/878,386, filed May 5, 2020, 8 pages.

United States Patent and Trademark Office, "Non-Final Office Action", issued in connection with U.S. Appl. No. 16/908,681, dated Oct. 27, 2021, 13 pages.

United States Patent and Trademark Office, "Final Office Action", issued in connection with U.S. Appl. No. 16/908,681, dated May 17, 2022, 10 pages.

United States Patent and Trademark Office, "Notice of Allowance", issued in connection with U.S. Appl. No. 16/908,681, dated Oct. 3, 2022, 10 pages.

* cited by examiner

AUTOMATED ENFORCEMENT OF SECURITY POLICIES IN CLOUD AND HYBRID INFRASTRUCTURE ENVIRONMENTS

RELATED APPLICATION

This application is a continuation of U.S. application Ser. No. 16/908,681, filed Jun. 22, 2020, which is a continuation of U.S. application Ser. No. 15/878,386 filed Jan. 23, 2018, which claims the benefit of U.S. provisional application 62/449,571, filed Jan. 23, 2017, U.S. provisional patent application 62/450,001, filed Jan. 24, 2017, and U.S. 62/477,376, filed Mar. 27, 2017, each of which is incorporated by reference herein for all purposes.

FIELD OF INVENTION

The invention relates to computer processes for securing computer networks against unauthorized access.

BACKGROUND

There are many existing mechanisms and devices that can enforce security policies at the network level in different points of the network or the computer system stack. These include network equipment such as routers, firewalls, Intrusion Prevention Systems (IPS), as well as software components running in operating systems, hypervisors, and virtual machines. Examples include Linux IP tables, Linux open vSwitch, Microsoft Windows Firewall, VMware NSX distributed firewall, etc. In addition, public and private cloud service providers—those who own and provide the hardware, network connections, underlying software, and other services to support running of third party application programs on virtual machines or in containers and the like—offer APIs to configure their virtual firewalls that enforce network communication for their virtual machines and container instances. Examples include Amazon® security groups and OpenStack® security groups. These mechanisms operate at the network level and are configured with rules specifying network elements. The phrase "cloud-native controls" will refer to built-in security controls offered by public and private cloud service providers.

A network security enforcement mechanism—typically implemented as a process performed by a computer under the control of stored software instructions, but also in hardware configured by software—intercepts network traffic at a given point along the traffic's communication path and checks the traffic against a set of network security rules. A network security rule is usually specified by a set of matching conditions and an action. Every packet processed by the enforcement mechanism may be checked against all the security rules. If the conditions specified in a rule is satisfied by the packet, the rule is said to match the packet. In general, more than one rule can match a packet. In this case a priority mechanism is used to select one of the matching rules and the action specified by the higher priority rule is applied to the packet.

Many different types of actions can be specified in a rule, two of which are allow and block. An "allow" rule allows the packet to continue on its path to its destination and a "block" rule discards the packet. Matching conditions of a rule can specify a set of conditions that common fields in a network packet should satisfy. These conditions may specify a value, a range of values, or a prefix that a packet field must satisfy. Packet fields commonly used in network security rules include: the IP protocol number in the packet IP header field; the destination IP address in the packet IP header field; the source IP address in the packet IP header field; the destination port number in the TCP or UDP header if the IP protocol is TCP or UDP; and the source port number in the TCP or UDP header if the IP protocol is TCP or UDP. Some network security mechanisms also use other packet fields such as layer2 MAC addresses, frame type, and VLAN id. They can also use metadata information that is not present in the packet data but can be extracted from the network processing environment such as for example the port in which the packet was received on a multiport device such as a network switch.

Different network security enforcement mechanisms offer different capabilities. Some enforcement mechanisms may not support both types of rule actions. For example, Amazon AWS security groups only support "allow" actions, and do not support "block" actions. Enforcement mechanisms differ in the degree of isolation from the workload unit. Enforcement mechanisms implemented at the operating system level are more susceptible to security threats that exploit vulnerabilities of applications running on the same operating system. If a threat is able to gain root access in an operating system it can disable the security rules of the enforcement mechanism. Enforcement mechanisms implemented outside the operating system are in a different security domain and are much less vulnerable to these threats. Among these, enforcement mechanisms implemented in separate devices, such as network firewall and switches, offer the lowest degree of vulnerability. A network security enforcement mechanism can offer one of several possible degrees of isolation in increasing order of isolation: same software domain as the workload unit; different software domain; different hardware domain.

Some enforcement mechanisms may be configured to generate a notification when a packet is discarded because it violates the network security policy. In general security mechanisms implemented in operating systems and hypervisors can be instrumented or programmed to generate these notifications. Network devices such as firewall and cloud network security API's usually do not offer this capability. Some enforcement mechanisms implemented at the operating systems can support matching rules that specify a particular application program. Some enforcement mechanisms have a maximum number of rules that be configured. Enforcement mechanisms in public cloud providers are examples of these mechanisms.

A network switch is not able, for example, to enforce policy rules on network packets sent between two virtual machines hosted in the same hypervisor, since these packets are not processed by the network switch. Physical network switches do not process packets exchanged between virtual machines hosted in the same physical server. Enforcement mechanisms implemented in an operating system will be able to intercept more traffic between applications running. Similarly, network security enforcement mechanisms implemented in a hypervisor and mechanisms offered by cloud service providers can intercept traffic between guest machines.

SUMMARY

To prevent un-authorized accesses to data and resources available in workloads on an organization's or enterprise's computer network, various improvements to automated computer network security processes to enable them to enforce network security policies using native network security mechanisms to control communications to and/or from, and thus prevent unauthorized access to, workload units of applications running on different nodes within hybrid computer network infrastructures having both traditional hardware resources and virtual resources provided by private and public cloud infrastructure services.

The various improvements are capable of supporting applications within hybrid computer network infrastructures having both traditional hardware resources and virtual resources provided by private and public cloud infrastructure services providers. Representative examples of systems and processes implementing one or more of these improvements perform one or more of the following: discovering real time network flows; discovering native infrastructure changes; enforcing micro-segmentation; provisioning of application security policy to security mechanisms native to cloud services and hardware; and continuously monitoring network flows to detect, block and/or quarantine threats, and to monitor security mechanisms to ensure the security mechanisms are configured as defined by policies, fixing detected misconfiguration.

The security systems and processes described below are implemented as software running on a computer server in communication with various security mechanisms native to an organization's or enterprise's data network infrastructure, and are useful for securing applications running not only virtual computing infrastructures, including those available through public networks (the Internet) and private wide area networks, but also in hybrid computer network infrastructures combing traditional physical networks and servers with virtual computing infrastructures.

According to one aspect of a representative example of a computer network security system, one or more processes running on computers in communication with an organization's computer network automatically configure native, network level security mechanisms within the computer network using security policies specified by the organization at an application level. The one or more processes map application level security rules to network level security rules, which are then provisioned to one or more infrastructure network security enforcement mechanisms at a plurality of different points with the computer system's infrastructure. These points include any one or more of the following: network devices (such as routers, switches and firewalls), operating systems, hypervisors, and public and private cloud service providers.

In one representative example, these processes automatically map application level security rules to network level security rules of a plurality of network security mechanisms based on one or more of the following considerations: the type of application level rules, the properties of the computing resources hosting the application, and the capabilities of the available network security enforcement mechanisms.

In yet another aspect of a representative security system, the processes automatically map application level security policy specifications into network level security enforcement rules that are provisioned automatically to one or more network security enforcement mechanisms at different points of the system infrastructure, including network devices, operating systems, hypervisors, and public and private cloud provider.

By configuring multiple network security enforcement mechanisms in a coordinated way, representative example of certain process described below are capable of taking advantage of different features provided by each network security enforcement mechanism to provide a more effective global application security that is stronger than the security provided by each individual mechanism in isolation.

Enterprises or other very large organizations often have many lines of business, departments, projects, and other sets or groupings of people, responsibilities, and resources. These groupings may be given responsibility for operating and managing a subset of the enterprise's computing network infrastructure resources. In accordance with yet another aspect of a representative example a computer network security system, the computer network security system implements processes for enforcing global computer network security policies across an enterprise but allows local groups or organizations within the enterprise to establish communication security policies infrastructure resources for which they have responsibility, without having to seek approval from a central security administrator. In this representative example, a large enterprise may enforce global network security across multiple lines of business or departments while giving smaller groups within the enterprise the agility to deploy new application or modify security policies of existing applications, without having to wait for central approval, which may slow down application deployments. Each subgroup may use the computer network security system to define its own policies specific to their applications and environments, provided they satisfy global enterprise constraints defined by global security administrators. Such as computer network security system is capable of permitting fast, self-service capability for creating network policies by individual groups, while preserving the control for global security organizations to define enterprise wide security requirements that the self-service policies need to satisfy.

These and other aspects of systems and process for securing applications in computer networks, particularly those with hybrid infrastructures comprising cloud services, are embodied in a representative example of a contextual security platform described below.

DETAILED DESCRIPTION OF EXEMPLARY EMBODIMENTS

In the following description, like numbers refer to like elements.

The systems and processes described below are implemented using software programs running on programmable computers. A programmable computer is a machine that is, in general terms, typically comprised of at least memory for storing one or more programs of instructions and a processor, such as a central processing unit (CPU), for performing a sequence of arithmetical and logical operations based on the program instructions stored or otherwise read or received by the computer.

Figure 1:
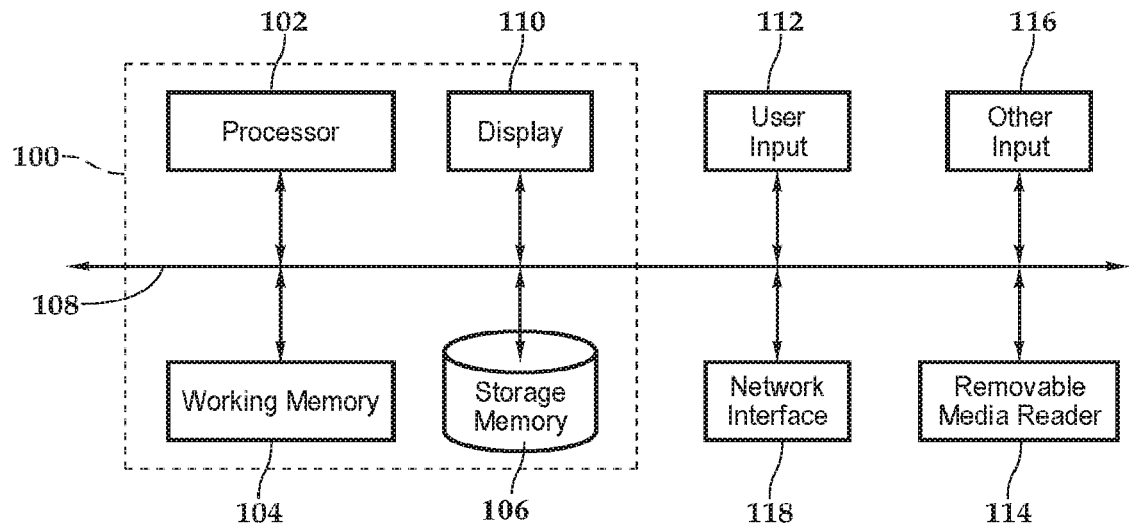
FIG. 1 is a schematic representation of a representative example of hardware components of a programmable computer.

FIG. 1 is a schematic illustration of the basic hardware components of a representative programmable computer system. Computer 100 comprises one or more processors, generally represented by processor 102, which comprise a CPU, for reading and executing instructions. Steps for carrying out the processes are encoded in one or more sets of instructions, or programs.

Computer 100 includes a processor 102. The processor is representative of implementations having one or more central processing units (CPUs), a graphics processing unit (GPU), other types of processors, and combinations of CPUs, GPUs, and other types of processors. The processor communicates with a main or working memory 104 and a storage memory 106 over one or more buses represented by bus 108. The main or working memory is intended to be generally representative of short-term memory used by the processor for storing instructions being executed and other data being processed, such as random access memory (RAM), including cache memory. Storage memory is representative of longer-term memory for storing program instructions and data structures, such as hard disks and solid-state disks. Bus 108 is intended to be representative of all types of bus architectures and other circuits for enabling communication between the processor 102 and other components of the computing machine.

The computer 100 may also be connected with other hardware to form a computing system or to implement a special purpose device that utilizes the computer's processing for control, communication, or other functions. For example, if intended to interact with a person, it may communicate with a user through visual display 110. Examples of visual displays include monitors such as liquid crystal displays, projectors, and other devices for creating visually perceptible images. The computer may also include one or more devices for enabling a user to enter information, control, and interact with the computing machine and a graphical user interface presented on the visual display. These are collectively designated 112 and may include, for example, depending on the computing machine, a keyboard, a mouse or track pad, a touchscreen, a microphone, and similar devices for providing interaction. A media reader 114 for reading removable media, such as an optical disk drive that reads optical media or a memory card reader, enables the computing machine to read data from and/or write data to removable data storage media.

The computer may also communicate with other types of other input and output devices through various type interfaces. These devices are generally designated 116. Examples include cameras, a Global Positioning System (GPS) receiver, and environmental sensors, such as temperature, light, and acoustic sensors, accelerometers, and gyroscopes. To communicate with other computers (or devices in which computers have been embedded), the computer may be connected to one or more network interfaces 118 that enables the computing machine to communicate with other computers and devices using known networking protocols. The network interfaces may be wired, optical, or wireless.

Program instructions to executed by the processor and data structures written or read by such processes, are stored on machine or computer readable media. Examples of such computer readable media include, but are not limited to, working memory 104, storage memory 106, as well as removable media being read by reader 114, While the machine-readable medium in the example embodiment can be a single medium, the terms machine readable medium and computer readable medium are generally intended to also include, unless the context clearly indicates otherwise, multiple media, and can be centralized or distributed among several computing machines.

A processor can be a microprocessor, a special purpose processor, or a combination of one or more processors of the same or different types. A few examples of machines or devices comprising or containing programmable computers include mainframe computers, mini computers, personal computers (PC), web appliances, network routers, switches, bridges, hardware firewalls, mass data storage devices tablet computers, set-top boxes, smartphones, personal digital assistants (PDA), cellular telephones. This foregoing list is not to be limiting. Furthermore, multiple computers may implement a process, each performing only a part of the process, or a separate instance of the process.

The term "non-transitory machine-readable medium" means any tangible medium or media, but not transitory signals, that is capable of storing, encoding, or carrying instructions for execution by the computing machine and that cause the computing machine to perform any one or more of the processes described below, or that is capable of storing, encoding, or carrying data structures used by or associated with such instructions. Examples of non-transitory machine-readable media include, but are not limited to, nonvolatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Although not illustrated, most programmable computers have an operating system. An operating system (OS) is set of computer programs that manage computer hardware and software resources and provides common services for application and other programs that are executed by the computer. As explained below, a single hardware computer can be used to support multiple, separate virtual computing environments for supporting execution of a software application. Processes described below can be programmed as an application and executed directly by a hardware computer or in a virtualized environment.

A programmable computer may be embedded into a special purpose device for providing the logic for controlling the device and/or extending its functionality and include, or be combined with, a number of other elements, including ports for connecting, for example, keyboards and visual displays to allow a person to interact with the computer, and network interfaces for allowing the computer to communicate with other computers over a network. Examples of computers include desktop and laptop computers, computers that act as servers, routers, switches, mobile devices, embedded computing systems, and any type of machine with one or more central processing units for executing instructions to perform programmed processes.

A computer system may also be emulated using software running on a hardware computer system. This virtualization allows for multiple instances of a computer system, each referred to as virtual machine, to run on a single machine. Each virtual machine behaves like a computer system running directly on hardware. It is isolated from the other virtual machines, as would two hardware computers. Each virtual machine comprises an instance of an operating system (the "guest operating system"). There is a host operating system running directly on the hardware that supports the software the emulates the hardware. The emulation software is called a hypervisor. A "container" or virtual container is another form of a virtualization environment for running applications. Rather than emulating an entire computer, container emulates, from the perspective on application, an operating system. A container can be thought of as a virtual operating system. The containers share a single instance of a host operating system running a hardware computer. Each instance of these virtual computing entities—the virtual machine, containers, etc.—behaves generally as would a separate computer and can be configured and operated as such as part of an enterprises network infrastructure, with separate network access controls configured for each instance using the virtualization environments security mechanisms.

One of the benefits of virtualization environments is that computers can be quickly created and deployed—"spun up"—as the need arises and configured as needed. Although such virtualization environments can be privately deployed and used within local area or wide area networks owned by an enterprise, a number of "cloud service providers" host virtualization environments accessible through the public internet (the "public cloud") that is generally open to anyone, or through private IP or other type of network accessible only by entities given access to it (a "private cloud.") This "infrastructure as a service" (IAAS) allows enterprises to access virtualized computing systems through the public Internet. Examples of public IAAS cloud providers include Amazon AWS, Microsoft Azure and Google GCP. Examples of private cloud environments include OpenStack and VMware vCenter.

Unless otherwise indicated, the term "computer" will be used to refer to not only hardware computers but also virtualized computing entities for supporting execution of an application, examples of which include virtual machines, virtual containers, based-file systems, thin virtual machines and the like.

Figure 2:
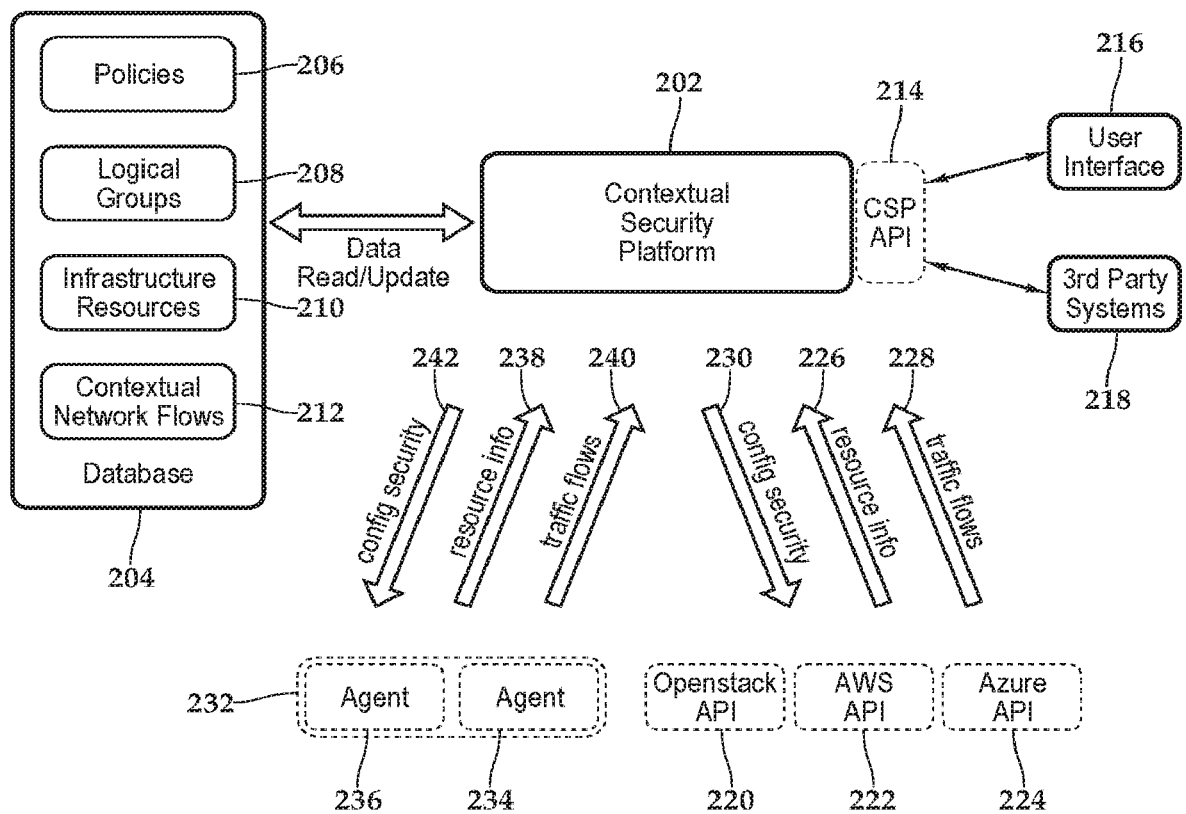
FIG. 2 is a schematic of a contextual security platform interacting with security components and databases storing application policies and infrastructure information.

Referring now to FIG. 2, the processes described below are representative examples of processes a contextual security platform 202. The contextual security platform comprises an application program, or a set of application programs, that is stored on computer readable and comprises instructions executed by one or more computers to perform one or more of the processes described below.

The contextual security platform implements a number of different processes. These processes include the following: discovering real time network flows between nodes hosting workload units (see FIG. 3); discovering of native infrastructure changes; enforcing micro-segmentation; mapping and provisioning of application level security policies to security mechanisms native to infrastructure of the computer network with which the contextual security platform is used; and continuously monitoring network flows and security mechanisms to detect, block and/or quarantine threats. Together, these processes establish a system for protecting data and resources available in workloads from un-authorized users and applications by preventing communication to and from workload units and allowing only authorized communication in cloud based, physical, and/or hybrid computer network infrastructures. However, each one of these processes could, individually, be useful in a computer network security system. The contextual security platform is an example of how each may be embodied in a way that allows them to work together.

The contextual security platform 202 functions as an engine or manager for implementing the logic for carrying out the processes. Data used by the processes of the contextual security platform is written to, and read from, one or more databases, represented by generic database 204, which store the information. The information being stored includes application level security policies 206, a listing of logical groups (explained below) 208, a system model comprising a database 210 of information on resources within the infrastructure of the computer network being secured, and a collection of information on contextual network flows 212. An application programming interface 214 may also be provided for supporting a user interface into the system as well as third-party software systems, as represented by blocks 216 and 218, respectively.

The contextual security platform 202 communicates with the application programming interface of one or more cloud service providers, representative examples of which are indicated by blocks 220, 222 and 224. The contextual security platform can support any number of cloud service providers, limited only by the scalability of the particular implementation. The contextual security platform exchanges messages with the cloud service providers using the native application programming interfaces provided by the services. The type of information the contextual security platform can request and receive from the API of each of the cloud service provider depends on the particular service. However, it preferably includes information on network resources provided by the service that are part of the infrastructure of the network being secured, as well as information on traffic flows to and from the network resources, as represented by arrow 226 and 228, respectfully. As a user might use a user interface for the cloud service provider to do so, the contextual security platform may also use the application programming interface to configure security mechanisms native to the services provided by the cloud service providers as indicated by arrow 230. Messages to and from the application programming interfaces many sent using protocols supported by the cloud service providers' APIs. Typical examples include IP, TCP, HTTP, HTTPS and other similar types of network protocols.

For traditional physical resources that do not offer an API, the resources are discovered using software programs called agents, indicated by blocks 232, that are installed on the physical resources. Two examples of physical resources, 234 and 236 are represented, in the figure. The same types of information agents communicate in a way similar to communications taking place over IP networks using, for example, TCP connections. As indicated by arrows 238, 240 and 242, messages are sent between the contextual security platforms in the agents. This information preferably includes receiving from the agents information similar to the exchanged with the cloud service providers namely information on the resource and data flows to and from the resource, as represented by arrows 238 and 240. It also preferably includes the ability to configure native security mechanisms that are part of that resource by sending messages to the agent containing configuration information, as represented by arrow 242.

In addition to traditional physical resources, agents can also be used to discover virtual or cloud resources when APIs are not available or when a driver plugin for that API has not been developed.

The system model database stores the application and infrastructure information needed by the context security platform. These include the list of managed compute environments and the available network security enforcement mechanisms in each one of them. It also includes the list of workload units, the nodes hosting the workload units and their associated parameters. This information can be configured using commands exposed in an API offered by the policy manager. These commands can be generated by a User Interface or by any other software system.

The information can be populated by automatic tools that can extract application information and enterprise policies from existing enterprise configuration systems, repositories or databases, or can also be manually entered by system, network and security admins using a user interface.

Software development and IT operations (DevOps) tools that automatically deploy applications can be configured to update workload information in the system model database when new applications are deployed or decommissioned. They can also update the database when new workload units are added or removed to an existing workload due to application scale up and scale down operations. They can also change the mapping of workload units to nodes when workloads are migrated. For example, when a workload is moved from an on-premise datacenter to a public cloud provider the system model database can be updated with a new mapping of workload unit to node and compute environment.

The IP address of a node is used as the IP address of the workload units hosted in that node. The IP address of the node can be obtained by different mechanisms: 1) It can be queried using the cloud provider API if the node is hosted on a public or private cloud provider, 2) It can be queried using the virtualization software manager API if the node is hosted on a virtual environment; 3) It can be provided by an agent running on the node; 4) It can be configured by an external software system; 5) It can be configured using a user interface.

When a workload unit is not managed by the policy manager it may not be associated with a node, but its IP address may still be needed if the workload unit offer services to some managed workload unit or need to access a managed workload unit. In that case the system model stores the IP address or DNS name associated with the unmanaged workload unit. If a DNS name is used, the corresponding IP address is computed using a DNS lookup operation. The DNS lookup operation can be performed multiple times by agents running on different regions in different compute environments, generating multiple IP addresses. These IP addresses can be different and depend on the specific region where the DNS lookup is performed. In that case, when configuring a specific network security enforcement mechanism, the correct IP address corresponding to the location of enforcement point is used.

Some application level policy rules may specify a range of network addresses (specified in CIDR or similar notation) as the client or provider of a service. In that case the network range is used as the source or destination IP address, respectively, of the network security rule configured in the enforcement mechanism.

When any infrastructure parameter change, such as for example a workload unit changing its IP address, an application security policy that uses that parameter is re-evaluated (all of them are usually reevaluated) and the corresponding network security enforcement rules are recomputed and updated on the corresponding enforcement points.

Figures 3, 4:
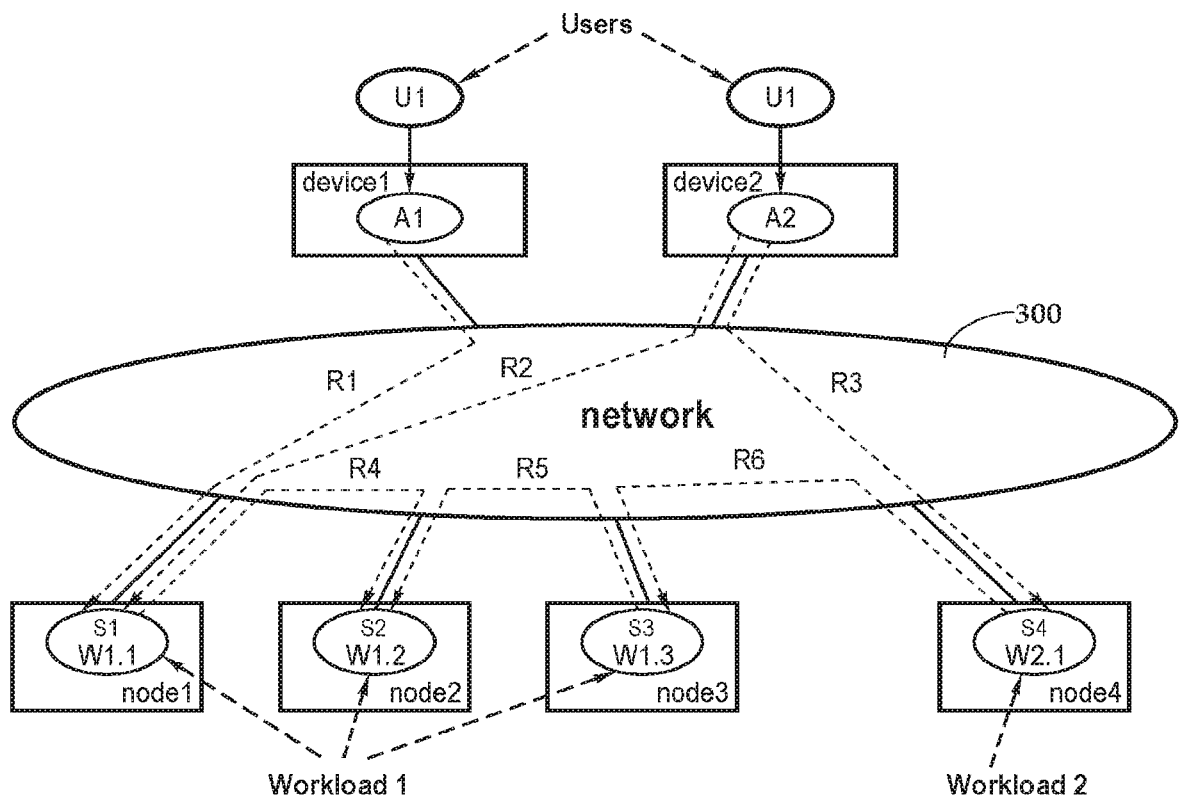
FIG. 3 is a schematic drawing of a representative example of distribution of workload units of and workloads on multiple nodes interconnected with users through a computer network, such as the Internet, and showing permitted communication connections specified by the security policy illustrated by FIG. 4
FIG. 4 is a simplified, representative example, presented in the form of a table, of a set of an application level set of security policies or rules for the example of FIG. 3.

FIG. 3 is a schematic illustration of a scenario of a relatively simple example in which users and applications deployed on multiple computers that are interconnected by a computer network or interconnected computer networks, such network or interconnected network being generally represented by cloud 300.

An "application" is a computer program or set of programs that, when executed, directs the computer perform useful one or more useful functions or processes. An application will typically have multiple concurrent processes running one or more computers. Multiple instances of a single application program may run on the same computer. A single application may be distributed to run on multiple computers, with different process being run the same or different processes run on more parts of a single application may run on different computers. or on different computers in communication with each other. Furthermore, an application program can have different parts executing on different computers in communication with each other. Different instances of the same application running on the same or on different computers, different applications running on the same computer, and different applications running on the same computer or on different computers, may exchange messages.

For purposes of the following description, an instance of an application program being executed by one or more computers will be referred to as a "workload." A workload is comprised of one or more workload units. Each workload unit is hosted in one computer, called a node, and executes a set of instructions (a program) that implements at least part of the logic for the application. Thus, a workload can be distributed over multiple nodes by having different workload units running on different nodes, with each workload unit running on a single node.

Workload units can be made capable of communicating with other workload units in the same workload or in another workload by exchanging messages over a network. Generally, these messages are contained within packets transmitted on a network or set of interconnected networks using Internet Protocol (IP). An IP network can be a local network, a wide-area network, or two or more interconnected networks, including, for example, the Internet. A workload unit can offer one or more services that can receive messages from remote clients using a pre-defined protocol. An example this product is HTTP, but it could be any number of other protocols. A person (a "user") interacting with an application (a web browser, for example) running on a computer can use the accessed application to send messages to, and to receive messages from, other workload units. A workload unit can offer one or more services that can receive messages from remote clients using a pre-defined protocol such as for example http.

In this example, there are two application workloads, workload W1 and workload W2; and two users, U1 and U2. Workload W1 has three workload units, W1.1, W1.2 and W1.3; and workload W2 has one workload unit, W2.1. User U1 can access workload units from device1 using an access application workload unit A1. User U2 can access workloads units from device2 using an access application workload unit A2. The dotted arrows show the application communication requirements. Workload units W1.1 and W1.3 need to use a service offered by workload unit 1.2. Workload unit 2.1 need to use a service offered by workload unit 1.3. Both users U1 and U2 should be allowed to access a service offered by workload W1.1, and User U2 should also be allowed to access a service offered by workload W2.1.

FIG. 4 is a simplified example of an application level security policy for the computer infrastructure of FIG. 3. It is presented in the form of table. However, it can be stored in any number of forms in a database. When given a set of users U1 and U2 from the example of FIG. 3 and workload units W1.1, W.2, W.1.3 and W2.1, an application level security policy specification defines a set of rules, R1 to R6, that specify which workloads and users may communicate with each other and the type of service that can be provided through that communication. These rules enable the communication pattern between a "client" of a given service (S1, S2, S3 and S4 are for examples that are given) and a "provider" of that service required for correct operation of the applications and also to enable users to access the workload units for which they are authorized to use.

Each rule specifies a service, a provider that offers the service, and a client that accesses the service. A rule can specify different possible actions. Two basic types of actions, "allow" or "block", are assumed, but any type of action that can be enforced by underlying network policy enforcement mechanisms can be used. An "allow" action indicates that the client is authorized to access the service. A "block" rule indicates that the client is not authorized to access the service. In addition to the rules, an application security level policy may also specify a default action that should apply to any communication not explicitly defined in any of the policy rules.

The following is a more description of various types application security policies that may be used with the system and processes described below. This list of security policy types is not intended to be exhaustive.

A white list communication policy explicitly defines the communication allowed between logical groups, particularly a source logical group and a destination logical group. The policy will specify, in addition to the logical groups, a network protocol (TCP, UDP, ICMP are well known examples of network protocols, but there are many others) and port number (for protocols that support port number) that is allowed between the two groups. Only explicitly defined communication is allowed. If a communication is not defined in the policy, then it is not allowed. White list communication policies (those including a rule with an "allow" action) are used by certain of the processes described herein to configure and check security groups and/or host firewall mechanisms. These network security mechanisms are typically configured to deny all communication that is not covered by the explicit rules defined by the policies.

Black list communication policies (those including a rule with a "block" action) define communication that is explicitly not allowed between a source and a destination logical group. This type of policy can be enforced by disabling logical group membership of resources that have "white list communication" policies that violate the black list communication policy.

Constraint policies define combinations of logical group membership that are not allowed. The constraints are defined as logical expressions with "and", "or" and "not" operators on logical group membership. For example, the expression "LG1 and (LG2 or LG3)" define that a resource cannot be a member of logical group LG1 and at the same time be a member of either logical group LG2 or logical group LG3. This type of policy is also enforced by disabling membership on security group that violates the constraints.

Security service requirement policy can be used to specify that resources in one logical group have a specific security service applied to it. For example, a policy can define that resources have their network traffic processed by a "Web Access Firewall" or an "Intrusion Prevention System" appliance.

Figure 5:
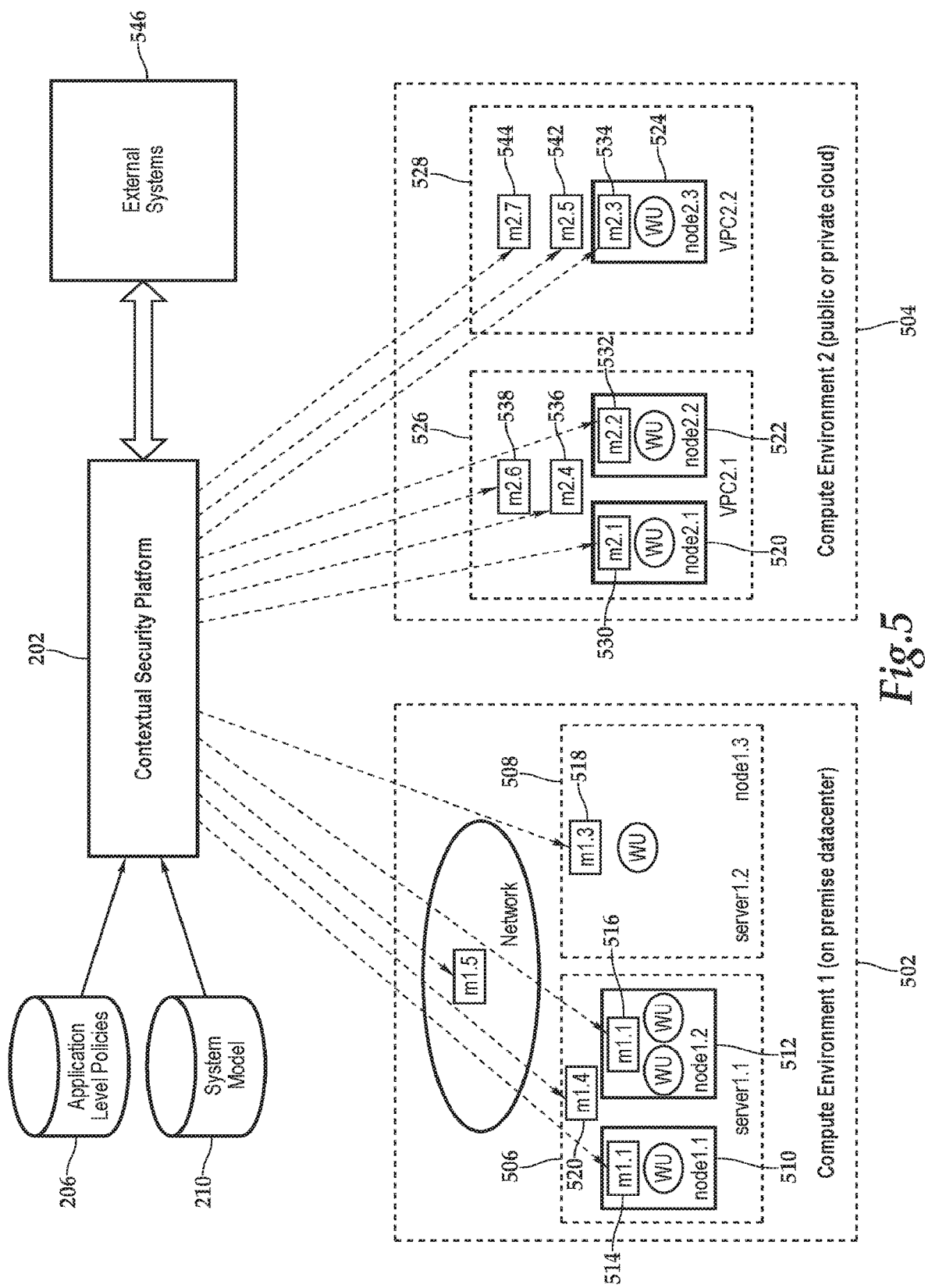
FIG. 5 is a schematic representation of a contextual security platform communicating with security mechanisms native to the computer infrastructure hosting workload units that have been distributed between a data center and a private or public cloud service provider.

FIG. 5 schematically illustrates or represents the processing architecture on an aspect of the contextual security platform for configuring different types of network security mechanisms (mx.y) for enforcing rules on network traffic at different points of the network infrastructure based on application level security policies. The policy manager provides a multi-layer in depth defense system and configure multiple enforcement mechanisms in a coordinated way. By configuring multiple mechanisms, the policy manager combines their different capabilities and features and offer a better effective global security than what each individual mechanism can offer in isolation. Using a database of the system model that describes the workloads, users, compute environments and available network security enforcement mechanisms, the contextual security platform automatically deploys network level security rules at appropriate enforcement points to protect the workloads.

Shown is this example is on premise data center 502 of an organization or enterprise, representative of a physical network, and a cloud service provider environment 504 that provides virtualized infrastructure resources for use by the organization as part of its computer network. While FIG. 5 shows only two environments, any number of environments can be controlled by the contextual security platform.

In the on-premise data center 502, there are two hardware server computers 506 and 508, that are intended only to be representative of a large number of servers that might otherwise be hosted in the datacenter. Information about the infrastructure resources identified in the FIG., such as applications (labelled "A"), servers (labelled "server"), nodes ("node"), security mechanisms (labelled "m"), and workloads (labelled "WU") are stored in infrastructure resource information database 210. This information about the infrastructure constitutes a model of the computer network—a "system model." Physical or hardware server computer 506, which is labelled server1.1. hosts two logical or virtual computer instances (virtual machines, for example) 510 and 512, labelled nodes 1.1 and 1.2 in the system model, respectively. Nodes can be bare metal servers or virtual machines or containers hosted on a virtual environment such as a hypervisor or an operating system with an application container technology. Node 1.1 is executing one workload unit of an application and node 1.2 host two workload units of the same or a different application. A workload unit (WU) execute application logic and are hosted in a compute node. Hardware server computer 508 is a "bare metal" server that hosts a WU unit directly. It is therefore labelled as node 1.3 in the system model. Each of the nodes includes a native security mechanism, labeled M.1, m1.2, and m1.3 in the system model, respectively and referenced with numbers 514, 516 and 518. Similarly, hardware server computer 506, even though it is not labelled as a node, may also have a security mechanism, labelled m1.4 in the system model.

Nodes can also be virtual instances hosted in a public or private cloud, examples of which are service such as Amazon AWS, Microsoft Azure Cloud, and OpenStack. These cloud providers can provide isolated network domains (for example Amazon EC2 "virtual private cloud) which can be isolated or connected with other VPCs or datacenter networks using virtual routers. A VPC allows creation a virtual network including IP address range selection, creation of subnets, and configuration of route tables and network gateways and provisioning of virtual resources from service provider to that domain. In the simplified, representative example of a cloud services environment illustrated in FIG. 5, there are three nodes 520, 522, and 524, which are labeled in the system model, respectively, as nodes 2.1, 2.2 and 2.3, each with one workload unit. Nodes 520 and 522 are hosted on a virtual private cloud (VPC) 526 labelled in the system model as VPC2.1 Node 528 is hosted on a second virtual private cloud 504 (not necessarily from the same service provider as VPC 526). Nodes 520, 522 and 524 each has a security mechanism 530, 532 and 534, respectively. They are labelled, 2.1, m3.2 and, 2.3 in the system model. Each VPC also has multiple security mechanisms. VPC 526 has security mechanisms 536 and 538, labelled m2.4 and m2.6. VPC 528 has security mechanisms 542, labelled m2.5, and security mechanism 544, labelled m2.7.

The contextual security platform provides a multi-layer in depth defense system and configure multiple enforcement mechanisms in a coordinated way. By configuring multiple mechanisms, the contextual security platform combines the different capabilities and features of the native security mechanisms to offer a better and more effective global security than what each individual mechanism can offer in isolation.

A network security enforcement mechanism intercepts network traffic at a given point in the communication path and checks the traffic against a set of network security rules. A network security rule is usually specified by a set of matching conditions and an action. Every packet processed by the enforcement mechanism is checked against all the security rules. If the conditions specified in a rule is satisfied by the packet, the rule is said to match the packet. In general, more than one rule can match a packet. In this case a priority mechanism is used to select one of the matching rules and the action specified by the higher priority rule is applied to the packet. Many different types of actions can be specified in a rule, but for the purpose of the following description, two common actions, allow and block, are considered. An "allow" rule allows the packet to continue on its path to its destination and a "block" rule discards the packet. Matching conditions of a rule can specify a set of conditions that common fields in a network packet should satisfy. These conditions may specify a value, a range of values, or a prefix that a packet field must satisfy. Packet fields commonly used in network security rules include:

The IP protocol number in the packet IP header field;
The destination IP address in the packet IP header field;
The source IP address in the packet IP header field;
The destination port number in the TCP or UDP header if the IP protocol is TCP or UDP; and
The source port number in the TCP or UDP header if the IP protocol is TCP or UDP.

Some network security mechanisms also use other packet fields such as layer2 MAC addresses, frame type, VLAN id, etc. They can also use metadata information that is not present in the packet data but can be extracted from the network processing environment such as for example the port in which the packet was received on a multiport device such as a network switch.

The contextual security platform maps application level security rules to network security rules of one or more network security mechanisms based on the type of application level rules, the properties of the computer environments hosting the application workloads and the capabilities of the available network security enforcement mechanisms.

The mapping relies on the database of the system model 210 that describes the workloads, users, compute environments and available network security enforcement mechanisms. The contextual security platform deploys the network security rules at appropriate enforcement points to protect the workload units in the compute environments.

The network policy enforcement mechanisms can control network traffic at different enforcement points. Host based security mechanisms (e.g. m1.1, m1.2, m1.3, m2.1, m2.2 to m2.3) are implemented by operating system mechanisms in the nodes that host the workload units. As they are co-located with workload units they can provide isolation among workload units hosted in the same node. On the other hand, they share the same software domain as the workload units and are more vulnerable to security threats that compromise the workload units or other software components in the nodes.

An environment managed by the contextual security platform can host nodes with different operating systems that provide different network security mechanisms. For example, Linux offers IPtables and Microsoft Windows offers Windows Firewall as network policy enforcement mechanisms. When nodes are virtual machines or containers, their traffic can be enforced by mechanisms running in the hypervisor or operating system hosting the virtual nodes (for example security mechanism 1.4). Examples of these mechanism include VMWare NSX Distributed Firewall and also Windows Firewall or Linux IP tables when these operating systems are used as hypervisors or containers hosts.

The contextual security platform can also configure firewall mechanisms implemented in network devices such as routers, switches and firewalls, an example of which is security mechanism m1.5. These network mechanisms could be, for example, configured using device specific or proprietary APIs offered by the manufacturer or using software-defined networks APIs such as Openflow. When using compute environments in public or private clouds, the contextual security platform uses the cloud infrastructure provider APIs, if available, to configure network security mechanisms offered by the cloud infrastructure service providers (for example security mechanisms m2.4-m2.7). Some cloud providers offer more than one network security mechanism. For example, Amazon AWS offer security groups that can enforce security rules for individual virtual machine instances, and also offer network access control lists (ACL) which can enforce security rules for traffic entering or exiting subnets.

The contextual security platform can offer APIs that can be used by external systems, represented by block 546 in FIG. 5 and block 218 in FIG. 1, as well as user interfaces, as represented by block 216 in FIG. 1, to configure the system model and define application level policies. For example, an external software deployment system can use the contextual security platform API to inform in which node, server, VPC or compute environment workloads are deployed. The contextual security platform can also interact with user management systems like LDAP or Active Directory to obtain user authentication and authorization.

Figure 6:
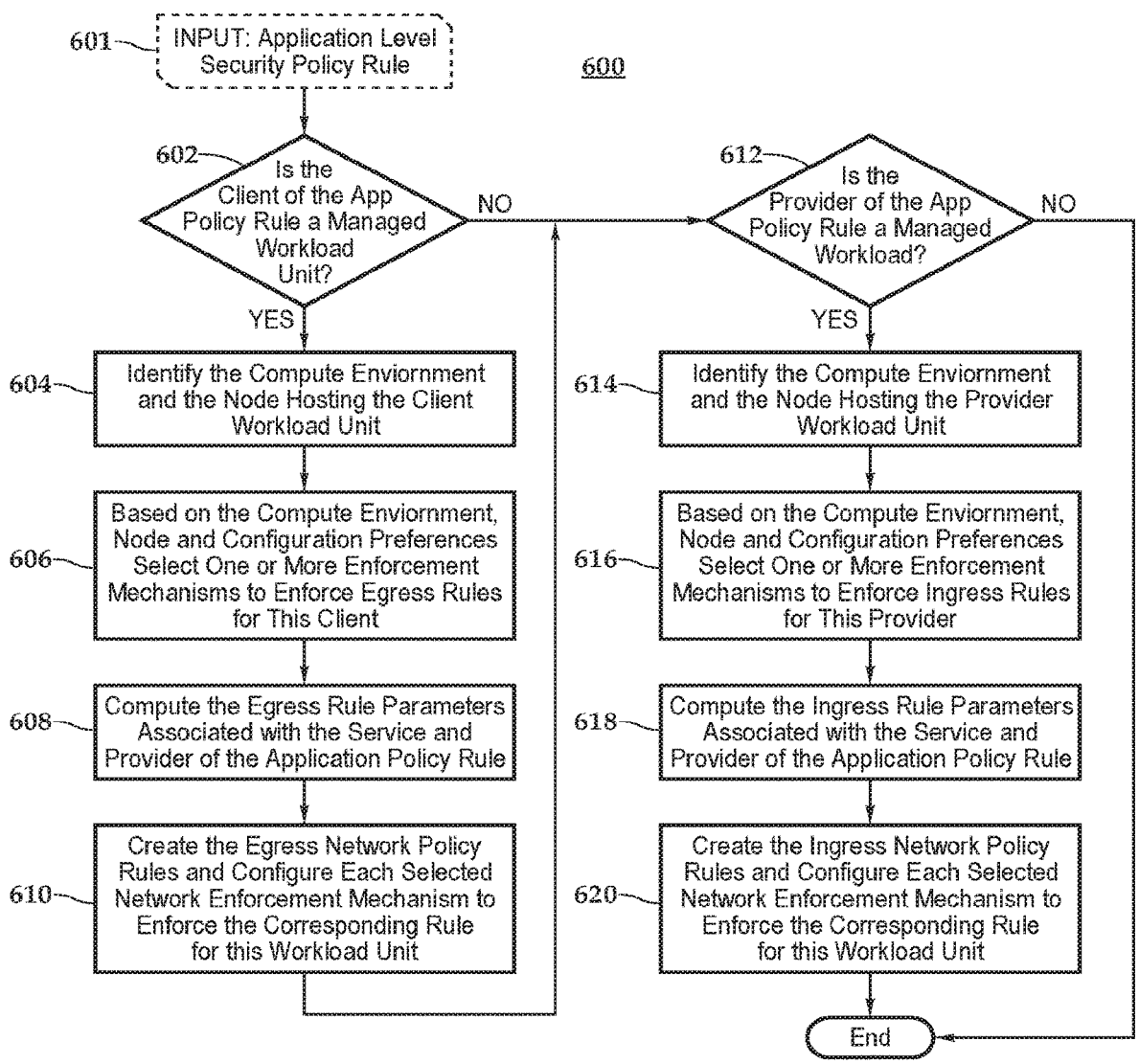
FIG. 6 is a flow chart illustrating a representative process for mapping an application level security policy rule to network level security policy rules that may be used by the contextual security platform.

FIG. 6 describes an exemplary process 600 of mapping an application level security policy rule to network level security policy rules that may be used by the contextual security platform. In this example, the application level security rules specify a service, a client of that service, and a provider of that service.

At decision step 602, the process determines whether a client of an application policy rule 601 is a managed workload unit. If it is, it identifies at step 604 the computing environment and the node hosting the workload unit using the system model that is stored part of the managed network's infrastructure resource information database 210. Then, at step 606, based on at least the computing environment and node, as well as, if desired, configuration preferences, the process selects automatically, using the system model, one or more security mechanisms to enforce egress rules for the client. At step 608, the parameters for at least one egress rule associate with the service and provider the service that is the subject of the application policy rule is computed. At step 610 the at least one egress rule is created and each of the one or more selected network security mechanisms is configured to enforce the at least one egress rule. The process then proceeds to step 612.

If, at step 602, the process determines that the client of the application policy rule is not a managed workload unit, it proceeds to step 612.

At step 612, the process automatically determines using the data or information stored in infrastructure resource information database 210 whether the provider of the service that is the subject of the application policy rule is a managed workload. If it is not a managed workload, the process ends. Otherwise, at step 614, the process automatically identifies the computing environment and the node hosting the provider workload unit. Then, at step 616, based on the computing environment, the node, and, if desired, the configuration preferences, the process automatically selects one or more security mechanisms to enforce one more ingress rules for this provider. Then at step 618, the process computes the parameters for the at least one ingress rule. Finally, at step 620, the process automatically creates the at least one ingress rule and configures each of the one or more selected network security mechanisms to enforce the at least one ingress rule.

Each workload unit can provide one or more services to a set of clients. The set of application security rules that specify the clients and services that can be accessed in a given workload unit define the set of ingress security rules that need to be enforced for that workload unit. And the set of application security rules that specify the providers and services that a workload unit can access define the set of egress security rules that need to be enforced for that workload unit. Thus, a given application level security rule can generate two network policy rules, an ingress network security rule for the service provider and an egress network security rule for the client of the service.

According to another process of the contextual service platform, the infrastructure of a computing system is automatically discovered. This may be done in one of two ways or in both ways, depending on the nature of the network resources.

In the first way, the process accesses over the network an application programming interface (API) offered by each of public and private cloud service provider that host a workload on a virtual server, container (for example those offered by the Docker and Kubernetes cloud services) or other virtual resource. Examples of virtual network resources include load balancers, routers, networks, subnets, database as a service, and web services. For traditional physical resources that do not have an API, resources are discovered using software agents installed on computers that communication the central CSP platform using TCP connections in addition to traditional physical resources, agents can also be used to discover virtual or cloud resources when APIs are not available or when the driver plugin for that API has not been developed yet.

There are various types of security mechanisms that are available in cloud and physical computing infrastructures with which the contextual security platform may be programmed to interact. This list is not intended to be exhaustive of all of the possible security mechanisms that exist or that might be developed.

"Security groups" are available in most cloud infrastructure providers, including AWS, Azure, GCP and OpenStack (see below). A security group define a set of rules that control inbound and outbound data communications to and from an infrastructure resource. The standard protocol currently used for sending data across interconnected computer networks is the Internet Protocol (IP), which sends data (such as messages or any other type of data) in packets between hosts using datagrams that can be routed through a computer network and between networks with regard to the underlying physical media. Therefore, the following examples parameters are given in terms of packet switched networks:

a) IP address or IP address of the packets, which indicate the source and destination hosts for the packets, can be used to specify with whom the resource can communicate by specifying the address or range of addresses to which data packets can be sent (for outbound rules) or from which the resource is permitted to receive data packets (for inbound rules).

b) One or more allowed, higher level communication protocols, such us Transmission Control Protocol (TCP), User Datagram Protocol (UDP), and Internet Control Messaging Protocol (ICMP), that is used to control the data flow or flow of packets between the resource and another host for a particular communication session.

c) The destination port, which is usually used to define the type of service for which the communication is taking place. For example, port 80 is used for web http request, port 443, for secure http requests.

However, the particular parameters types of parameters may change depending on the type of networking protocols in use. Security groups are configured based on white list communication policies. To configure security groups the system maps logical objects to resources using logical groups and then maps the resources to their IP addresses using discovered resource properties.

"Host firewalls" are software firewalls implemented in host operating systems that control inbound and outbound traffic to the host. These firewalls are configured in the same way as security group using "White list communication policies. "Web application firewalls" (WAF) is an application level firewall that filters, monitors, and blocks HTTP traffic to and from a web application. An "Intrusion Prevention System" (IPS) is a computer network service that examine network packets content to detect and prevent vulnerability exploits. Usually offered in cloud providers as an appliance which process network traffic for resources. Next generation Firewalls, an example of which is the Palo Alto Networks Firewall), combine traditional firewall capabilities with advanced filtering capabilities that can operate at application level using deep packet inspection techniques. Data encryption mechanisms can be used to encrypt data at rest or when it is being communicated through the computer network. Finally, "generic security" is any other type of security service offered by an infrastructure service provider. For example, Amazon Web Services offers a security service called "Inspector," that inspects virtual machines and access applications for vulnerabilities and deviations from best practices.

Different network security enforcement mechanisms offer different capabilities. One of the criteria used so select enforcement mechanisms by the following process are the capabilities of the security enforcement mechanisms. Briefly discussed below are some of the one or more capabilities that may be taken into account by the process:

Supported actions. Some enforcement mechanisms may not support both types of rule actions. For example, Amazon AWS security group only support "allow" actions, and do not support "block" actions Degree of isolation from workload unit. Enforcement mechanisms implemented at the operating system level are more susceptible to security threats that exploit vulnerabilities of applications running on the same operating system. If a threat is able to gain root access in an operating system it can disable the security rules of the enforcement mechanism. Enforcement mechanisms implemented outside the operating system are in a different security domain and are much less vulnerable to these threats. Among these, enforcement mechanisms implemented in separate devices, such as network firewall, switches, etc., offer the lowest degree of vulnerability. A mechanism can thus offer one of three possible degrees of isolation in increasing order of isolation:

1) Same software domain as the workload unit,
2) different software domain,
3) different hardware domain Notification of discarded packets. Some enforcement mechanisms may be configured to generate a notification when a packet is discarded because it violates the network security policy. This can be useful for detecting missing policy rules or for generating alerts of possible security threats. In general mechanisms implemented in operating systems and hypervisors can be instrumented to generate these notifications. Network devices such as firewall and cloud network security API's usually do not offer this capability Support matching condition on application program. Some enforcement mechanisms implemented at the operating systems can support matching rules that specify a particular application program. This can be useful to define different security policies for different workload units that are hosted on the same node.

Maximum rule capacity. Some enforcement mechanisms have a maximum number of rules that be configured. Mechanisms in public cloud providers are examples of these mechanisms.

Network coverage. When protecting a given workload unit an enforcement mechanism may not enforce the policy rules in all traffic sent from or to that workload unit. For example, a network switch is not able to enforce the policy rules on network packets sent between two virtual machines hosted in the same hypervisor, since these packets are not processed by the network switch.

Enforcement mechanisms implemented in the operating system have the highest degree of network coverage. Mechanisms implemented at the hypervisor or offered by cloud providers have the same degree of coverage if a workload unit does not share the same node with another workload unit. Otherwise, hypervisor or cloud provider mechanisms cannot enforce policy rules for network traffic between these workload units. Physical network switches have the lowest degree of network coverage as they do not process packets exchanged between virtual machines hosted in the same physical server.

Turning now to FIG. 6, steps 602 to 610 are executed if the client of the application policy rule is a managed workload unit. These steps generate network egress rules in one or more network policy enforcement mechanisms for the specified client. Steps 612 to 620 are executed if the provider of the application policy rule is a managed workload unit. These steps generate network ingress rules in one or more network policy enforcement mechanisms for the specified provider workload unit. To generate the egress rules in step 608, the service is mapped to the following possible parameters: 1) a protocol (such as TCP, UDP, ICMP, or any other IP protocol), 2) the IP protocol version (IPV4 or IPV6), and 3) a port number used by the service (if supported by the protocol). The workload unit provider is mapped to an additional set of parameters that can be used by each selected network enforcement mechanism to identify the destination of the network traffic at the enforcement point. A typical parameter used to identify the workload unit is its IP address (either an IPV4 or IPV6 address or both). But some mechanisms can use additional parameters to identify the workload unit. For example, operating systems enforcement mechanisms, such as Linux IP tables or Windows Firewall can use the application executable name or the process name to identify the workload unit. This allows finer control of the network policy rules that can separate network traffic for different workload units hosted on the same node (for example, workloads in node 1.2 of FIG. 5). Step 608 uses the action specified in the application policy rule to configure the action of the network security enforcement rule. Similar to step 608, step 618 computes the service and the client workload unit parameters to generate the ingress rules, for the provider workload unit.

The parameters used to configure ingress and egress rules in the network security enforcement mechanism are obtained from the system model database of the policy manager. The following are a list of some example parameters obtained from the system model database:

Protocol and destination port: The protocol and port associated with the service offered by the provider workload.

Destination IP address (optional for ingress rules): The IP address associated with the provider workload unit.

Source IP address (optional for egress rules): The IP address associated with the client Source port: in general, the source port is configured to "any port".

Process and/or application executable name (optional): The process or application executable associated with the provider workload unit, if used in an ingress rule, or with the client workload unit if used in an egress rule. This parameter only needs to be configured if multiple workload units are hosted on the same node.

Users that need to access managed workloads units need to be authenticated. Authentication can be done by the policy manager itself or it can be done using an external user authentication mechanism such as LDAP or Active Directory. Once the user is authenticated, the policy manager updates all network security rules generated from all application level policy rules defined for that user. When updating the network security rules, the policy manager need the network IP address associated with the authenticated user. This IP address can be obtained using different mechanisms:

The IP address can be obtained from a request submitted by the user to the policy manager requesting access to services in one or more workload units.

The IP address associated with the user can be configured using the policy manager API by the user interface or an external software system.

The IP address can be generated by an agent running in the client according to the mechanism described below In some network configurations, a user IP address can also be used by other users. This can happen for example if there is a network address translation device between the user access device and the workload unit accessed by the user. Several users behind the network address translation device, may have their private IP address translated into the same IP address in the network that host the workload unit. In this scenario, it may be desirable to use additional mechanisms to identify the user, instead of relying only on its IP address, such that only the authorized user is allowed to access the workload unit. An example of such mechanism is the following.

An agent running on the user device authenticates the user with the policy manager. The agent monitors network traffic generated by the user and intercept requests to access workload units managed by the policy manager. If the agent detects such an attempt, it forwards a request to access the workload unit to the policy manager on behalf of the user. The policy manager checks if the user is authorized to access the workload unit by checking the set of application level policy rules for that workload unit. If the user is authorized to access the workload unit, the policy manager generates and sends to the user agent a unique secret key. The policy manager also adds a temporary ingress security rule for the workload unit authorizing access from the client IP address. The user agent sends the secret key on a special network packet to the workload unit that the user is trying to access using the same source TCP or UDP port. An agent running on the same node as the provider workload unit, intercepts this packet and forward the key with the received source TCP or UDP port to the policy manager. The policy manager validates the secret key, and if it is the correct key it replaces the temporary ingress security rule with another rule that include not only the user IP address but also the source port used by the user to access the workload unit. With this rule, only the authorized user is able to access the workload unit. Other users using the same IP address will not be able to access the workload unit, since the network address translation device will map their connection requests to different source ports.

The mechanism described above may allow access from non-authorized users that share the same IP address with the authorized user for a short period of time. After the temporary ingress security rule is added, all users with that IP address are able to send packets to the workload unit, until the rule is replaced with the rule that include the correct source port of the authorized user. This can avoided by having the agent running on the same node as the workload unit to block all traffic from the user IP address (except maybe for traffic from other users already authorized) until the final ingress rule is created. This allow the agent to receive the special packet with the secret key but prevent any non-authorized network packet to reach the workload unit. After the policy manager configures the ingress network security rule with the correct source port, it notifies the workload unit agent to allow traffic from that IP address again.

The contextual security platform, in one embodiment, configures multiple network security mechanisms in a coordinated way in order to take advantage of the combined set of features and properties of all the mechanisms. For each application level policy rule, the contextual security platform selects one or multiple network security enforcement mechanism to enforce that application policy rule in a coordinated way. The selection of the mechanisms is based on the required application policy and desired properties configured in the system.

Figure 7:
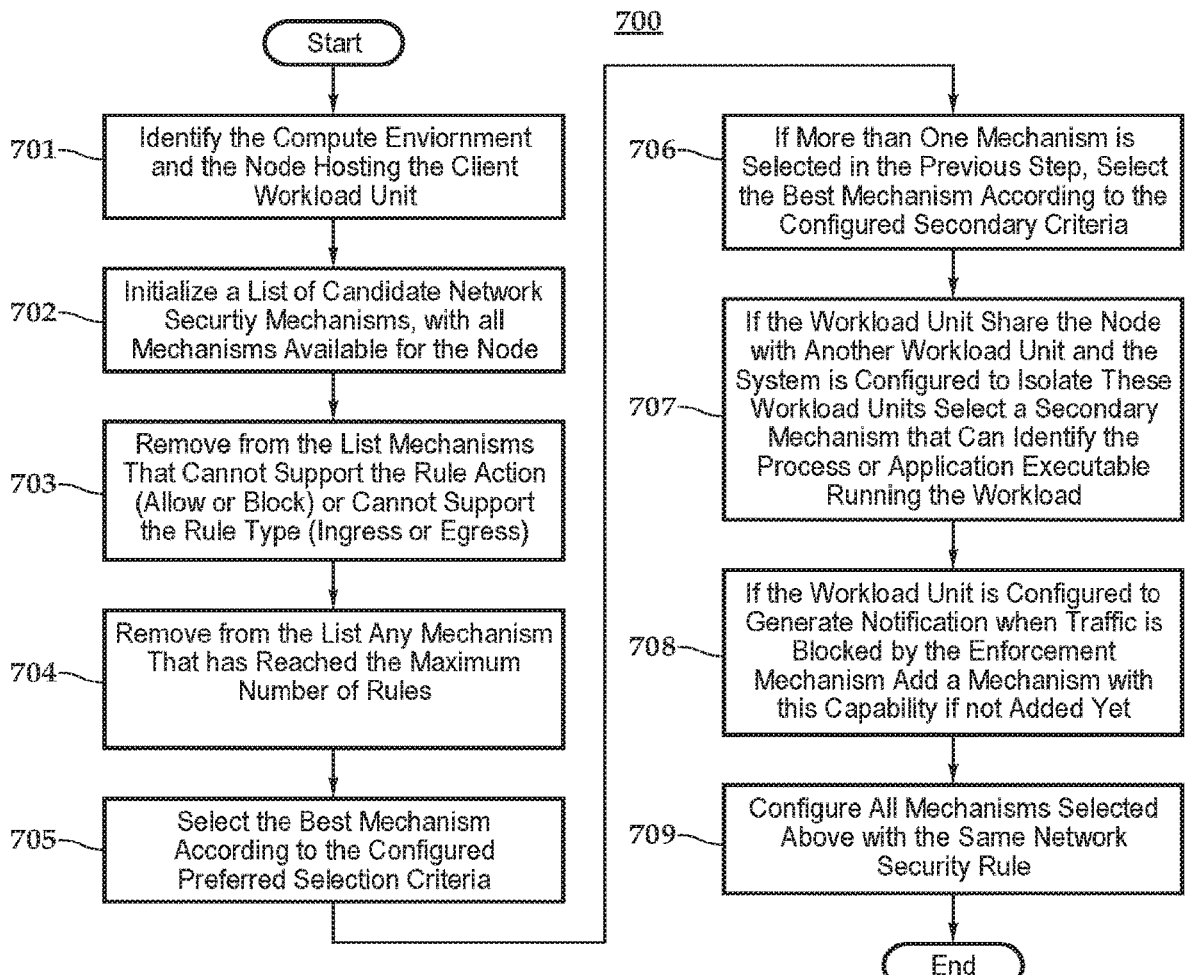
FIG. 7 is a flow chart illustrating a representative process for selecting the set of network enforcement mechanisms.

The flow chart of FIG. 7 illustrates a process 700 for selecting the set of network enforcement mechanisms. Different compute environment can offer different mechanisms with different capabilities. The set of available mechanisms can be determined by identifying the compute environment in which the node hosting the workload unit is located. Not all mechanisms can be used to support a particular application level security rule. For example, some mechanisms may only support ingress rules but not egress rules (e.g. Network firewalls available in Google Compute Engine cloud environment do not support egress rules). Some mechanisms may support only one type of action, allow or block (e.g. Amazon AWS security group do not support "block" action, but only "allow"). The collection of mechanisms that can support the required application level security rule and offer the best properties are selected as follows.

First, from the set of available mechanisms for the node hosting the workload unit, only those that can support that type of rule is considered. Also, some mechanism may have restrictions on the number of rules. These steps are represented by blocks 701, 702, and 703. As indicated by block 704, if any mechanism reaches the maximum number of rules, it is removed from the list of candidate mechanisms to be selected. Of the remaining mechanisms, the process of FIG. 7 selects one mechanism using one of two possible criteria, as indicated by blocks 705 and 706. In one of these criteria, the method selects the mechanism with the best network coverage. In the other criteria, the method selects the mechanism with the best degree of isolation from the workload unit. The selection of which criteria to use can be done using a system configuration option. If more than one mechanism is selected by the primary criteria, then the method uses the other criteria to favor one of the mechanisms. This is represented by blocks 705 and 706. If more than one mechanism is still selected any one can be chosen. It is possible that the selected mechanism does not offer all the capabilities needed. For example, as indicated by block 707, if isolation between workload units that share the same node is desired and the workload unit is sharing the node with another workload unit, then a mechanism that can identify the application program as a matching condition is added as an additional mechanism if that is not supported by the primary mechanism. Similarly, if the workload unit is configured to generate notifications when packets are discarded because they violate the network security, then an additional mechanism that supports this capability is added, as indicated by block 708. After the selected enforcement mechanisms are identified they are all configured with the same security rule (except for maybe rule conditions not supported by the mechanism), as indicated by block 709. This coordinated configuration of multiple network security mechanisms, allows an effective global security policy that combine the best features of all mechanisms, providing better security for the application than any individual mechanism could do in isolation.

An extension to the selection mechanism described above is to select more than one mechanism to enforce the same security rule with redundancy. This way if a mechanism is compromised by a security vulnerability and stops enforcing the desired security rule, the other mechanism would continue enforcing it. In this case a configuration option would specify a desired level of redundancy (number of mechanisms enforcing the same rule) and the mechanism would try to select that number of mechanisms if possible using the same criteria described used to select the first mechanism.

The processes of the contextual security platform discover the infrastructure resources of the computer network being managed, and then map the logical objects in the application security policies to the computer network infrastructure resources that have been discovered so that native security mechanisms applied to infrastructure resources can implement the application level security policies. This mapping is accomplished, in a preferred embodiment, by associating with application security policy logical objects logical groups (described below) and infrastructure resources tags that comprise key/value pairs.

Security policies are specified using logical objects such as application name, computer service, data (such as an HR database), or security posture, examples of which include PCI compliance and HIPPA compliance. For example, a security policy can define if an application can access a specific database or computer service, or if the application needs to be compliant with a given security posture such as PCI.

The processes of the contextual security platform associate infrastructure resources with logical objects using attributes. Attributes are <key, value> pairs associated with resources that define a logical property of the resource. For example, if a server is used to host an application name "app1" it would have an attribute with key="application" and value="app1".

Logical objects that are used to define application security policies are represented by logical groups. For example, a logical group can be used to represent an application, an application component (e.g. the web tier in a 3-tier application), a group of applications (e.g. all HR applications), a security posture (e.g. all PCI compliant applications), a data set (e.g. a database with clients' personal info), etc.

For example, if a server is used to host an application "app1" it could have an attribute with key="application" and value="app1". Each logical group defines a set of "selection" attributes that are used to select infrastructure resources to be members of the logical group. For example, the attribute <"application", "app1"> can be the "selection" attribute for the logical group used to represent application "app1". In this case, all resources that have this attribute become members of this logical group.

Infrastructure resources such as servers, disk volumes, and many other types of resources found in a computer network are also mapped to logical groups using attributes that are <key, value> pairs associated with infrastructure resources.

Attributes can be assigned to infrastructure resources using different mechanisms:
  a) Infrastructure tags. Cloud infrastructure service providers such as AWS, Azure, GCP and OpenStack allow used defined tags to be associated with infrastructure resources. These tags are read using the API of the service provider during the process of discovering infrastructure resources and used to automatically map discovered infrastructure resources to logical groups. This allows automatic deployment of policies when new resources are discovered.
  b) Resource property. An attribute can be assigned to resource based on any property of that resource that can be read using the infrastructure provider API. For example, an attribute <"subnet", "abc"> can be associated with resources using the "abc" subnet
  c) User input. User can manually assign attributes for discovered resources using CSP console or UI.
  d) Logical group assigned. A logical group can also define "assign" attributes in addition to the "selection" attributes. "Assign" attributes are automatically added to resources that are selected as member of the logical group. For example, assume that a logical group PCI defines a selection attribute <"compliance", "pci"> to selects resources that should satisfy the PCI security posture. Anding an APP1 logical group defines a selection attribute <"application", "app1"> to select resources hosting application app1. Now assume application app1 is a PCI compliant application. In this case, logical group APP1 can define an "assign" attribute <"compliance", "pci"> which is automatically assigned to all resources of application "app1". This ensures that all resources for application app1 are assigned policies defined for PCI logical group.

In addition to "explicit" logical group defined with "selection" attributes or by manually selecting resources, "implicit" logical groups can be automatically created to represent any groups that may already exist in cloud providers. These groups are created based on properties assigned to discovered infrastructure resources. An important property of these logical groups is that membership cannot be configured or changed as it is based on existing resource properties. Example of implicit groups include:
  a) Amazon AWS resource properties: VPC, region availability zone, account, network, and subnet, for example.
  b) Microsoft Azure resource properties: Resource Group, region, Virtual network, and account, for example.

c) OpenStack resource properties: project, region, networks, and subnet are examples.

Incoming and outgoing network traffic flows for infrastructure resources are captured and mapped to logical groups containing the monitored infrastructure information. This allows the system to identify and expose the communication requirements needed for the logical objects defined by the logical groups. Raw network traffic with low level raw network data such as IP addresses are therefore mapped to logical objects, such as application, application component, security posture, and also infrastructure groups such as AWS VPCs, OpenStack Projects, etc., which are high level objects used by policies.

This capability allows the system to extract real-time communication requirements and define micro-segmentation policies that restrict communication among applications and generic logical groups to the strict necessary to support the applications. These policies can block all communication that is not needed to support the system application and services and prevent lateral movement of any malware that is able to break into a specific application, preventing the malware to propagate to other components.

In addition, by mapping communicating endpoints to logical groups, the system can identify any violation in communicating policies between logical groups including explicit and implicit infrastructure groups, inside a single cloud provider or across different cloud providers.

For example, if a policy prevents resources in a given AWS VPC to communicate with resources in a given OpenStack Project, and if the endpoints of a flow is mapped to that VPC and Project, then a policy violation is detected.

In addition to detecting active communication to and from monitored resources, the system also detects attempts of communication that are blocked by security enforcement mechanisms (flow violations.) This allows the system to detect and generate alerts when components try to violate communication policies which could indicate a malware activity. These are called flow attempted violations or simply flow violations.

Using infrastructure provider APIs or agents, the system monitors the configuration of the existing security mechanisms and verify if they comply with the defined security policies, generating alerts if any violation is detected.

Infrastructure providers offers multiple types of security mechanisms. These mechanisms are automatically configured to enforce the policies defined in the system. For example, communication policies that define allowed communication between logical groups are uses to create security rules in AWS Security groups, OpenStack Security groups, Azure Security Groups, Host Firewalls, etc. These rules are deployed to the infrastructure resources using infrastructure provider APIs or agents.

The configuration of security mechanisms is optional. The contextual security platform could just check if the configuration of an infrastructure security mechanism is compliant with policies or not. In a preferred embodiment, the contextual security platform may have a configuration mode—either active and passive—that can be set for each security mechanisms. For example, the configuration may be set to actively configure security groups rules, but only monitor if applications are properly configured to use AWS WAF security mechanism based on policies.

The processes of the contextual security platform may also automatically change the policies associated with individual infrastructure resources based on alert events or user input. This is accomplished using a "policy state" associated with resources. Usually a default "normal" state is associated with discovered resources. Logical groups are usually defined to select only resources in the "normal" state. However, other policy state values can be defined for resources, and other logical groups defined to select resources in these other state values. When a resource changes its state the set of logical groups that the resource belongs change as well. Only logical groups defined for that "policy state" are applied to the resource. This allow the system to change the set of policies applied to resource when its state changes.

A state can be automatically changed for a resource based on alert events. For example, the system can change the "policy state" of a resource from "normal" to "quarantine" when the processes of the contextual security platform detect a violation of a security policy, or perhaps repeated attempts to violate a security policy. For example, if the processes of the contextual security platform detect more than 10 data flow violations in a period of 5 minutes, a process within the contextual security platform would cause the resource to be removed from all logical groups defined for "normal" policy state and possibly add the resource to logical groups defined for the "quarantine" state based on its attribute and the "selection" attributes of the logical groups.

A logical group can define more than one "policy state" to select resources. In this case resources in either state can be members of the logical group.

Application security policies can be used to configure mechanisms across different infrastructure providers. This allow the same policy to be used in different providers, enabling applications to be moved across providers and security mechanisms automatically deployed and configured based on the existing policy definition. Thus, there is no need to manually reconfigure and change security mechanisms because, for example, an IP address changes. A process within the contextual security platform will automatically detect and update the configuration automatically based on higher level policies.

Furthermore, the processes of the contextual security platform may also continuously monitor each security mechanism to make sure that it is compliant with application level security policies and automatically reverse any changes to the security mechanism done outside of the contextual security platform system. security configurations can, therefore, be locked using the contextual security platform because security policies are defined in software and used to automatically configure security mechanisms, using heterogeneous APIs of different infrastructure providers.

Figure 8:
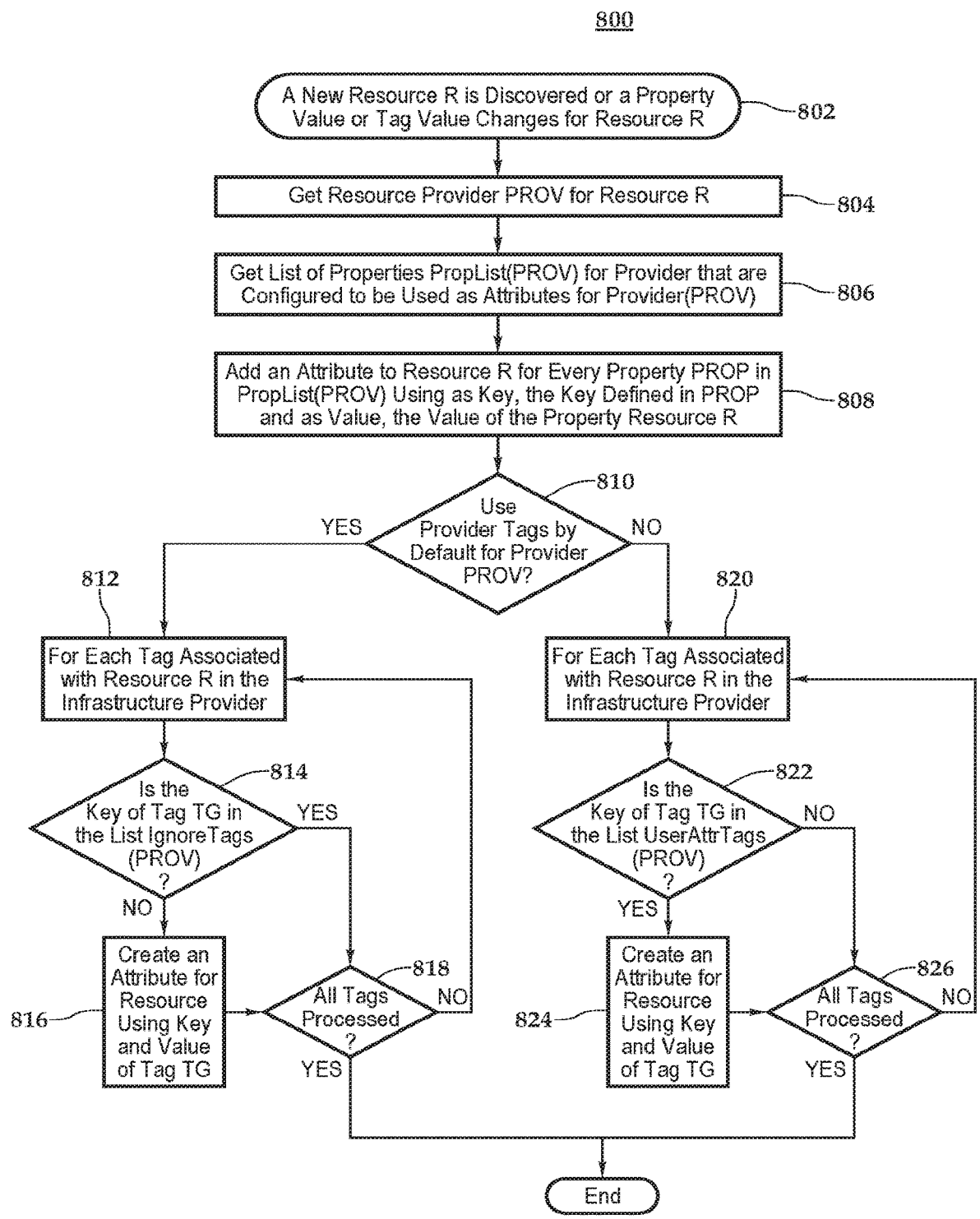
FIG. 8 is a flow chart illustrating a representative process for discovering and applying tags for resources.

FIG. 8 represents an exemplary process 800 of discovering and applying tags for resources.

Prior to the execution of the illustrated process, a user configures the contextual security platform to access an infrastructure service provider account by entering account credentials to allow access to the application programming interface of the infrastructure provider API.

As represented by steps 802 to 808, the contextual security platform continuously discovers infrastructure resources. To do this, the contextual security platform periodically, in a configurable time interval, queries infrastructure provider APIs (for all configurable accounts) and retrieves a list of existing resources with their properties. The contextual security platform then automatically updates infrastructure information database 210 (FIG. 2) with this information, adding new resources and updating entries for existing resources when values of properties change or resources are deleted. As indicated by step 802, the process of FIG. 8 handles a discovery of a new resource or a property value or tag value change for particular resource. The resource provider for that resource is obtained at step 804, and a list of properties for that provider that are configured to be used as attributes for that provider is obtained at state step 806. This information is stored by the infrastructure resource information database 210 or elsewhere. As indicated by step 808, the process adds tags to the infrastructure information database for that resource an attribute for each property in the property list, using the key defined in the property list for each property, and assigns to that key the value for the property for the resource that is obtained from the service provider.

If tags applied by the service provider are to be used by default, as indicated by step 810, steps 812 to 818 are performed. The contextual security platform can be configured to indicate for each service provider whether or not to use by default the tags from that service provider. This configuration information can be stored, for example, in the infrastructure resource information database 210, or elsewhere. Furthermore, certain tags from the service provider can be ignored, as indicated by step 814. Again, this information can be stored in the infrastructure resource information database 210. As indicated by steps 812 and 818, a loop is performed for each tag from the service provider, which checks at step 814 whether or not the tag is to be ignored and then creates at step 816 an attribute for that resource using the key and value of the tag read from the API of the service provider.

If provider tags are not used by default, the process, as indicated by blocks 820 and 826, performs a loop for each tag associated with the resource read from the infrastructure service provider. Whether the tag is part of a list of attribute tags to be used for that provider is checked at step 822. This list can be stored in infrastructure information database 210. If it is, an attribute is created at step 824 in the infrastructure information database for that resource with the key and value that is read from the infrastructure service provider. Otherwise, no attribute is created.

As previously mentioned, users access the contextual security platform through an API and/or a user interface and define security policies and logical groups. Users also configure the selection criteria of resource membership in each logical group. The contextual security platform continuously updates the list of members in each defined logical group. Resources are added or removed when new resources are discovered or when their properties change (for properties used in logical group membership).

Using the list of defined policies and logical groups with their current list of member resources, the contextual security platform computes the desired configuration of the security mechanisms required by the policies. The contextual security platform computes which resources need to have native security mechanisms based on resources selected as members of logical groups. The type of security mechanisms and their configuration is computed based on the policies defined for the logical groups and the properties of the resources associated with logical groups. For example, if a security group is configured to enforce a "white list communication policy," the IP address of a resource is used to configure security group with allowed traffic based on which remote resource a given resource is allowed to communicate to and from.

As previously mentioned, the contextual security platform can operate in active or passive mode for each native security mechanism. In active mode the contextual security platform uses the provider API to configure the security mechanism to match the desired state. In passive mode the contextual security platform just reads the configuration from the provider and check if it matches the desired configuration, generating alerts if not.

The contextual security platform continuously monitors the state of the native security mechanisms using the provider APIs. If the state diverge alerts are regenerated and based on system configuration, it changes back the security mechanism to match the desired state, bringing the contextual security platform back to be compliant with policies.

Using a cloud service provider API (when available) or agents, the contextual security platform collects data flow information for all discovered resources and store them in a database. Data flow information that is received may comprise, for example, a TCP or UDP connection between two IP addresses, specifying a port. As network flows are collected the processes of the contextual security platform automatically tag each data flow with identifiers for both endpoints or resources that are communicating in that flow. This is automatically done by the processes of the contextual security platform using the IP address observed in the raw flows and mapping it to the IP addresses associated with resources that were previously discovered by the contextual security platform. This allows the flows to also be associated with all logical groups for which the resources are members, including explicit logical groups and implicit groups based on infrastructure properties. These flows are then stored in a database with the contextual information of resources and logical groups (contextual flows).

Data flows with context information can be graphically visualized in the UI or accessed through the API, exposing current and historical communication among any arbitrary group of resources and logical groups. This visualization exposes the required communication for the applications and services running in the environment. This is useful both for debugging applications and network connectivity, but also for defining communication policies.

Based on flow information observed in a user selected time period, the contextual security platform automatically computes "white list communication policies" needed for a group of selected resources or logical groups. Policies that allow only the communication defined by the observed flows are created but no other one. Optionally the user has the option to extend the policy to include additional protocols, ports, resources or logical groups.

To summarize, depending on which of the processes described above are implemented, a contextual security platform in an exemplary embodiment can provide one or more of the following advantages:

Continuous discovery of all public/private cloud native infrastructure objects.

Continuous discovery virtualized and bare metal servers, including workloads, services, existing security controls, and data flows.

Creation of visual, searchable maps are created in a user interface that are updated minute by minute.

Auto-provisioning of native controls based on discovered data flows, tags, attributes and/or infrastructure memberships.

Automating of granular micro-segmentation across providers for superior security.

Automatically calculating and adjusting the necessary security policy changes as workloads spin up, down or even move cloud service providers.

Monitoring real-time data flows between workloads and comparing to deployed security policies for compliance.

Monitoring the amount of data transferred between the workloads to detect illegal activities.

Generating alerts on any violations and blocks them and can quarantine offending workload.

Monitoring of native enforcement points. Any accidental or malicious changes to native controls are immediately identified and rolled back.

Generation of real-time maps that can be filtered for risk and compliance to security policies.

Automating control of different polices across development, test and production.

Detecting of unauthorized modifications to security configurations.

Separating of duties between development/operations and Security.

Approving the use of protected tags.

Continuous visualization of changing cloud infrastructure to identify business changes and potential risks.

Continuous monitoring of infrastructure, data flows and security policies to identify threats to the attack surface.

Automatic generation of real-time alerts in response to detection of risks and threats that could compromise deployments.

Corrective actions to block, quarantine or rollback threats.

Continuous discovery across public and private cloud providers to automatically map and visualize native infrastructure resources in just minutes.

Making visible pervasively VMs, containers, micro-services, security policies and associated real-time network data flows.

Analysis of real-time network flows, security controls and infrastructure changes to ensure policies are intact, compliant and protecting the environment.

Continuous inventorying of all native infrastructure objects of the specific cloud provider and visually maps them, including, for example, AWS Regions, VPCs, Containers, Virtual Machines, Services, existing Security Groups, real-time network data flows and more.

Updating of discovery maps, minute by minute as the environment changes, such as when computing resources spin up or down, including building and re-building a real-time map of the infrastructure and associated data flows.

Generating visualizations of the entire hybrid/multi-cloud environment—not just cloud resources, but virtualized and bare metal environments as well.

Building of interactive, visual maps that are interactive and users can filter, zoom and search.

Building of maps that visually identify malicious and non-compliant activity in real-time.

Because the cloud-native security controls are outside the workload, the controls will remain in effect even if the workload is suddenly compromised by malware. By comparison, host-based controls reside inside the attack zone. Furthermore, numerous cloud services (e.g. RDS, Lambda, NoSql. and others) require the use of native controls for access. Thus, the ability or capability to manage and enforce native controls can be desirable. Leveraging these native controls (e.g. AWS and OpenStack Security Groups, Azure Network Security Groups, etc.) results in workloads that are better protected than those in traditional data centers. Cloud-native controls coupled with automation, allow for segmentation and isolation based on infrastructure, applications, services and more, protecting against both the North/South and the East/West threat. Micro-Segmentation, which utilizes whitelisting (allowing only the absolute minimum connectivity), can be an easy and effective protection for workloads from attackers. Because workloads spin up and down quickly (sometimes without intervention of IT team), automation can provide important benefits and advantages to securing applications on a computer network.

By reducing human intervention during the secure development and management of cloud workloads, security controls can be automatically provisioned and overall security improved. High levels of automation throughout the development/production lifecycle can significantly reduce the chance of misconfiguration, mismanagement and mistakes.

Cloud providers may implicitly group workloads into VPC's (AWS), resource groups (Azure), projects (OpenStack). Thus, a workload's infrastructure membership can be used to define an application security policy. As new workloads spin up, they can automatically inherit policies associated with their membership within the cloud infrastructure by having the contextual security platform assign policies for members of that infrastructure.

Explicitly defined workload attributes (tags or labels) can represent logical membership for which security policies can be automatically applied. Tags can be used to represent where a workload is running (development, staging, production, etc.) Security policies can be applied to security mechanisms to automatically enforce the required environmental separation.

Workloads can carry additional tags representing sensitivity driving subsequent security policy (such as HIPPA or PCI tags). Tags can also be used to automate micro-segmentation of workloads into applications, services or microservices. Application developers can assign "tags" and attributes as part of their development/orchestration process. Security teams should control the associated policies for those tags.

Security Teams/Risk Teams can deploy monitoring and visibility solutions in order to identify potential threats quickly while also confirming compliance to policies. 3rd party automation can also be used to provide detailed visibility into real-time state and status of the cloud infrastructure. Allowing for or supporting use of visualization/logging can include insight into real-time data flows, workloads, applications, services, containers and more. Continuous monitoring can compare workload data flows to actual policies to alert on malicious activity, and continuously watch the cloud native enforcement points to make sure they are not altered and are in compliance with intended policies Multi-Tenant Exemplary Embodiment Referring now to FIGS. 9 to 16, a typical use case of any one or more of the computer network security processes described above is for managing the security of computer networks operated by a large enterprise or organization. Enterprises or other very large organizations often have many lines of business, departments, projects, and other sets or groupings of people, responsibilities, and resources. These groupings may be given responsibility for operating and managing a subset of the enterprise's computing network infrastructure resources, which may include, for example, computers, network devices, and applications. These smaller groupings of users and resources will be referred to generically as "groups" or "local organizations" in the following description. Different enterprises or large organizations can use local organizations in many other different ways, and therefore the following examples are not intended to be limiting.

In a computer network security management application having one or more features of the contextual security platform described above in connection with FIGS. 1 to 8, the computer network security application is used to manage global computer network security policies to be enforced across an enterprise, but delegate establishment and deployment of security policies for a subgroup of computing network infrastructure resources within the enterprise.

The computer network security management application is programmed to allow a user to configure one or more administrators—for example, persons responsible for global security policies for an enterprise—to be given access to all organizations within the enterprise, including a global organization (the entire enterprise), and to assign to them permission to command the network security application to perform one or more of the following global tasks: create and delete local organizations; create global attributes and make them public for global use, or export them to specific local organizations that need to use them; create global policies and make them available across all local organizations within the global organization through public or exported attributes; pre-approve usage of public or exported attributes by others or all local organizations; approve or deny request to use public/exported attributes not pre-approved; define global communication constraint policies and assign them to local organizations, limiting the policies that can be created by the local organizations assigned to a specific line of business or department; and define attribute constraint rules for global and exported attributes.

The computer network security application may also be set up to allow or authorize a local organization associated with, for example, a particular line of business or department, to assign policies to computer network resources, such as those that it manages, uses, or deploys or sets up for its own user. First, the computer network security application may be programmed to allow a local organization using the application to select a global policy available to the local organization, in which case the local organization cannot modify the policy and can only use policies that were previously defined and are pre-approved. Second, the computer network security application may also allow a local organization to create and deploy, using the application, its own policies, but only if the policies are allowed by constraints defined by the global organization and enforced by the application. By using such a network security application, each local organization—for example, each line of business within an organization—may be permitted to quickly define their own policies specific to their applications and environment, provided they satisfy global enterprise constraints defined by one or more global security administrators.

The computer network security application thus addresses technical problems of securing a large computer network against unauthorized access while allowing multiple groups or local organizations within the enterprise to define security policies for computing network resources that each group or local organization uses. Furthermore, implementing such capabilities in computer processes requires solving a number of technical problems.

The following are non-limiting examples of implementations of processes in a computer network security application that address one or more of the technical problems. The application may comprise a collection of software programs that are executed on the same or distributed over multiple computers. The contextual security platform described above in connection with FIGS. 1 to 8 is one example of such a computer network security application having certain features that can be adapted to implement these processes. However, not all of the features of the embodiment of the contextual security platform described above are required for implementing the processes described in connection with FIGS. 9-16.

Before describing these processes, the following explains certain features implemented for the exemplary embodiment computer network security application for implementing the processes described below to solve these problems.

Logical Objects

Information about an enterprise's computer infrastructure resources and logical objects (attributes, logical groups, zones, for example) used by the computer network security application is stored in memory accessible by it. This information can be stored in one or more databases and/or files stored in a computer memory and accessible by the application. In the following description, references to logical objects and resources in the context of a description of a computer process, is intended, unless the context indicates otherwise, to refer to computing object that is comprised of, at least in part, data stored in memory, which can be acted on (created, removed, read, and/or written to, for example) by the computer network security application. A computing object can be a data structure, or a table, column, row, or relationship within a database, for example. The following description is not intended to be limited to any particular manner of representing or storing the computing objects for use by the computer network security application. Unless the context indicates otherwise, a reference to a "resource" in the description of the process below is intended to refer to a computing object that represents computing processes of the actual infrastructure resource, and not the actual infrastructure resource itself.

The following are examples of types of logical objects that processes of the computer network security application may create, read and modify:

a. An attribute, which is a property associated with a resource used to deploy a security policy.

b. A network zone, which defines one or more ranges of IP addresses. A range of IP addresses is a set of continuous IP addresses in the address space, usually defined in CIDR format (for example, 10.11.12.0/24, which include all IP addresses between 10.11.12.0 and 10.11.12.255).

c. A logical group, which is group of infrastructure resources used to define policies.

d. Application, which is a set of logical groups defining the resources that support an application and/or components (tiers) of the application.

e. A security policy, examples of which are communication policies, communication constraint policies, and attribute constraint policies.

Each logical object may also have one or more of the following parameters, which are common across all types of objects: a name unique in the local organization for that type of object; an identifier that uniquely identifies the object in the system; and an identifier for the local organization that owns the object.

Attributes and Attribute Constraint Policies

The computer network security application delivers or applies communication policies to infrastructure resources using attributes. An attribute is a logical object.

Attributes are, in effect, assigned to infrastructure resources, which are also represented by computing objects stored in memory, by the computer network security application associating in memory the attribute with the resource. References to "resource" in the following discussion will refer, unless the context indicates otherwise, to the computing object stored in memory and being acted on by the computer network security application, which represents the actual infrastructure resource that exist on the computer network. Once assigned, this association can be used by the computer network security application in various ways as discussed above in connection with FIGS. 1-8, including, for example, provisioning of security policies to infrastructure resources.

The assignment of the attribute to the resource can be done using one or more of the following mechanisms or processes.

The first exemplary mechanism uses tags from an infrastructure services provider. Cloud or infrastructure service providers such as AWS, Azure, GCP and OpenStack allow users, though the service's user interface or a third-party interface accessing the service's application programming interface (API), to define and associate tags with infrastructure resources created using, and hosted by, the service. Using a discovery process, which can be triggered to run automatically, the computer network security application reads the infrastructure tags for infrastructure resources hosted by a cloud service provider by communicating with the cloud server provider's API. Based on the tags received by from the cloud service provider, the computer network security application automatically associates corresponding attributes to a resource, if the association is permitted for that resource using processes described below. These processes thus allow automatic deployment of communication policies for a new resource when the new resource is discovered on a cloud service provider.

A second exemplary mechanism is the computer network security application assigning automatically an attribute to a resource based on any property of that resource that can be read using an infrastructure provider API. For example, an attribute <"subnet", "abc"> can be associated with resources using the "abc" subnet.

A third exemplary mechanism is that a user of the computer network security application can manually assign attributes for resources discovered by the application using a console or user interface to the application.

A final example of such a mechanism is indirect assignment. The computer network security application can assign attributes to all members of a logical group. A "select" attribute associated with the logical group can be used by the application to select resources as members of the group, and an "assign" attribute associated with the logical group can be used to cause the application to assign automatically to members that are selected in an attribute. For example, assume that a logical group PCI defines a selection attribute <"compliance", "pci"> to select resources that should satisfy a PCI security posture. Assuming also that an APP1 logical group defines a selection attribute <"application", "app1"> to select resources hosting application app1. If application app1 is a PCI compliant application, the logical group APP1 can define an "assign" attribute <"compliance", "pci"> which is automatically assigned to all resources of application "app1". This ensures that all resources for application app1 are assigned policies defined for PCI logical group.

In the preferred embodiment of the computer network security application, the application associates an attribute, like other logical resources, only with one local organization, which becomes, in effect, the "owner" of it. Only resources associated with that local organization can be assigned that attribute, unless the attribute is made public or exported. A public attribute (also called global attribute) is available for association with any one or more of the local organizations and can be requested to be assigned to infrastructure resources associated with any local organization.

The computer network security application may also "export"-associate—in response to a request, for example, an attribute with another local organization within the global organization. Export allows the attribute to be requested for use in multiple local organizations but not in all local organizations. Public and exported attributes therefore give access to the attribute to local organizations other than the "owner" of the attribute.

However, if an organization has access to a global attribute, this may not be sufficient to allow the local organization assigned to one of the local organization's resources. In one embodiment, the computer network security application may have the capability of requiring that at least certain global attributes require an explicit approval by a global administrator before they can be assigned to a resource of a local organization. If such an attribute is requested, the local organization may request its use in one of its local resources, but the computer network security application will not allow assignment of the attribute to the resource immediately upon request. Rather, the attribute will only be assigned to the resource in response to a global administrator approving the request. If a global administrator denies the request, the computer network security application will not assign the attribute to the resource. On the other hand, certain attributes may be pre-approved, in which case no approval request is needed. The request of that global attribute causes the computer network security application to assign the requested global attributed to be assigned to the resource immediately.

In the preferred embodiment, a local organization that owns an attribute may indicate that the attribute may be used by certain ones of the other local organizations, with any request being made to use it, in which case the computer network security application will permit its use with resources associated by the computer network security application with pre-approved local organization. Otherwise, the computer network security application will allow an attribute not owned by a local organization to be associated with a resource associated with that local organization only if a request is made with the computer network security application and the attribute's owner approves it with the application.

Attribute usage approval can be given for different resource scopes: all resources associated with the requesting local organization, a subset of the resources, or a single resource, and the computer network security application will enforce the scope of the approval. If approval is given for all resources or a subset of the resources in the organization, the computer network security application may automatically approve a new resource that is within the approved resource scope to use the attribute at the time the resource is created.

An attribute constraint policy is used by the computer network security application to determine when an attribute may be assigned to a resource. An attribute constraint policy comprises a set of rules (one or more rules) that define a set of combination of attributes that are not allowed to be assigned to a single resource. The constraint rules used by the preferred embodiment of the computer network security application can be specified or defined as logical expressions with "and", "or" and "not" operators on attributes assigned to a resource. For example, the expression "ATTR1 and (ATTR2 or ATTR3)" define that a resource cannot have attribute ATTR1 and at the same time has either attribute ATTR2 or attribute ATTR3.

Local Organizations or Tenants

Also, stored in a database and/or file accessible by the application is information in a form useful by the process for identifying one or more local organizations that may be given authority to manage security for one or more computer network resources of the enterprise.

In one preferred embodiment, each computer network infrastructure resource, or predefined group of infrastructure resources, is associated with one or more local organizations that may be given some authority for managing it against unauthorized access. A local organization, which may also be referred to as a tenant, is defined using information stored in memory by, for example, the computer network security application. The local organization may represent a specific subgroup inside the enterprise, for example, a department, organization, project, and/or line of business.

In one preferred embodiment, each computing network infrastructure resource and logical object stored and managed by computer network security application is associated with a local organization as its "owner." Other local organizations, besides the owner, may have access to the same infrastructure resource and/or logical object, but an infrastructure resource may have only one local organization acting as its owner. A listing of resources assigned to, or owned, a local organization is determined, or defined, by a resource scope that is stored in memory and accessible by the computer network security application. A resource scope can be defined as an explicit list of resources, or it can be can defined using implicit infrastructure groups available from a cloud service provider. Some examples of possible resource scopes that can be assigned to a local organization include the following: all resources; all resources of a particular provider type (for example, all AWS instances, or all Azure VMs); all resources of a particular provider account (for example, all resources in a particular AWS account); resources in a provider specific implicit resource group, as described above, examples of which include an AWS VPC, an OpenStack Project, an Azure resource group, an AWS availability zone, and a region in an AWS account; and any combination of the above, for example, two accounts in AWS and one project in OpenStack.

User Roles

A user role can be associated with one or more users. A role defines a set of permissions that allows a user to direct the application to perform operations on objects defined within the computer network security application. These objects may represent actual computing or network resources, or can be logical objects, examples of which are given below, created using the computer network security application. Each user role is associated with one or more local organizations. The computer network security application uses a set of stored local organizations to define a set of objects that a role can see and/or manage according to the permissions associated with the role.

Multiple roles can be defined to give different users access to the computer network security application on behalf of the same local organization, thus allowing different users in a local organization to have different permissions to manipulate the organization's objects.

When a role allows a user to use the application to access objects assigned to multiple organizations and to create a logical object, the application allows the user to select and assign one of the organizations to be the owner of the new logical object. The role can also be configured within the application to default to a particular local organization, which will be assigned as the owner of a new object if a user does not choose one. In one embodiment, the application may also be configured to allow a user to change the ownership of a logical object when a role assigned to the user allows the user access to both the previous and new organization and permits the user to perform this action with the application.

Communication Policy Rules and Constraints

A communication policy rule is one type of logical object that can be used by the computer network security application for configuring computer network security mechanism to allow or disallow communications to or from a computer network resource. A communication policy is comprised of one or more rules that specify whether to allow and/or block network communication to or from a particular infrastructure resource. In addition to the common parameters of logical object, a communication policy rule has the following parameters: a logical group that defines the infrastructure resources that should have the policy; and a list of rules.

Each communication policy rule has the following parameters:
   a. A target, which is a remote site or resource with which communication is to be allowed.
   b. One or more protocols, which may be, for example the particular protocol that allowed traffic can use. Examples of such protocols include that are part of the IP suite of protocols, such as TCP, UDP, and ICMP.
   c. One or more destination ports for TCP and UDP protocols (ignored for other protocols).
   d. A direction for the flow of the network traffic. For example, inbound would be communication initiated from the remote target to one or more resources in a logical group. Outbound would be a communication initiated from a resource in the logical group to the remote target.
   e. An action, which either allows or blocks the network traffic based on matching or not matching the other parameters for identifying a permitted or unauthorized flow of packets to or from the infrastructure resource rule.
   f. An optional time specification defining the times when the rule is active. This can be specified as a single occurrence with start time and duration, or a periodic time interval that repeats over an arbitrary period (for example 8 am-5 pm of weekdays, or every Sunday, or every $5^{th}$ day of the month, etc.). If no time is specified, the rule is active all the time.

The target of a communications policy rule can be one of two types: a logical group, in which case the rule applies to communication flows to or from all resources members of the logical group; or a network zone, in which case the rule applies to communication flows to or from resources assigned to a network address (e.g. an IP address) within a range or ranges associated with the network zone.

The computer network security application will, in one embodiment, generate and provision rules to one or more infrastructure network security enforcement mechanisms within the computer system's infrastructure that will allow communication between two points in the network only allowed if there is a policy rule that explicitly allows that communication and there is no rule that explicitly blocks it.

A role for a user can be defined within an embodiment of the computer network security application to allow a user assigned the role to have access, using the application, to all communication policies owned by local organizations that the role has access to. For those communication policies the role can permit the user to read and/or modify using the computer network security application the communication policies based on the privileges assigned to the role. In addition, the computer network security application is programmed to allow a user assigned a role to access in read-only mode (regardless of the role privileges) policies for which attributes (of the associated logical group) are public or exported to a local organization that the role can access. The attributes do not need to be approved to have read access privilege to the corresponding communication policies associated with the attributes.

A role can only create policies that are allowed by a set of constraints, called communication constraint policies. Each organization has a constraint policy which limit the type of policies that can be created for that organization. Constraint policies create constraints that are enforced by the computer network security application for "allow" rules in communication policies. A similar set of "block" constraint rules can be used by the computer network security application to constrain the type of "block" rules that can be created in communication policies.

In this embodiment of the computer network security application, the application is programmed to permit a local organization (through a user having a role with appropriate privileges) to create a communication policy rule for a resource only if it is explicitly allowed by a constraint communication policy rule and is not explicitly blocked by a constraint communication policy rule. A communication constraint policy is set by the global organization. With it the computer network security application may automatically check communication policy rules created for local organizations for compliance with global security policies.

A constraint communication policy rule may have one or more of the following fields or parameters:
 a. Resource scope. The resource scope defines the resources that can use the policy. If not defined, the rule applies to any resource in the owner organization. If the resource scope is defined, the resource scope must be contained by the local organization. For example, if a local organization resource scope includes two AWS accounts, the rule scope need to specify only one of the AWS accounts. In that case, only resources in that one AWS account are allowed by the computer network security application to use the policy.
 b. Target type. Examples of target type in representative examples of a computer network software application implementing this feature include: a logical group, which allows the remote target to be defined as a logical group; and network address, which allows the remote target to be specified using network zone.
 c. Target resource scope (Only if the target type is logical group). This is similar to a resource scope, but for the remote target.
 d. Network address range (Only if the target type is network address). This specifies one or more ranges of network addresses, in such as IP addresses, that can be used in a policy rule.
 e. Maximum size of address ranges (Only if target type is network address). This limits the size of the ranges specified in the network zone used in a communication policy rule. Not only the address ranges in the network zone have to be contained by the IP address range in the constraint rule, but each address range cannot have a size larger than the specified maximum. This allows, for example, rules with individual IP addresses in the IP address range (if maximum size is 1), but no subnet ranges even if the subnet is contained in the IP address range. If no maximum is needed this could be set to the size of the IP address range, allowing the full range to be used in a communication policy rule.
 f. Protocol. The communications protocol to which the communications policy constraint rule would apply. Typically, for a computer network, this will be one of the protocols in the suite of IP protocols, examples of which are TCP, UDP, and ICMP.
 g. Port. This field allows specification of a single port, a range of ports, or all ports.
 h. Direction. This field specifies the direction of the flow of packets constituting the communication. It can be inbound or outbound.
 i. Action. This identifies the action that can be taken by the communication policy rule when the communication policy rule is matched. The actions include allow and block.

Assigning Attributes to Resources

Figure 9:
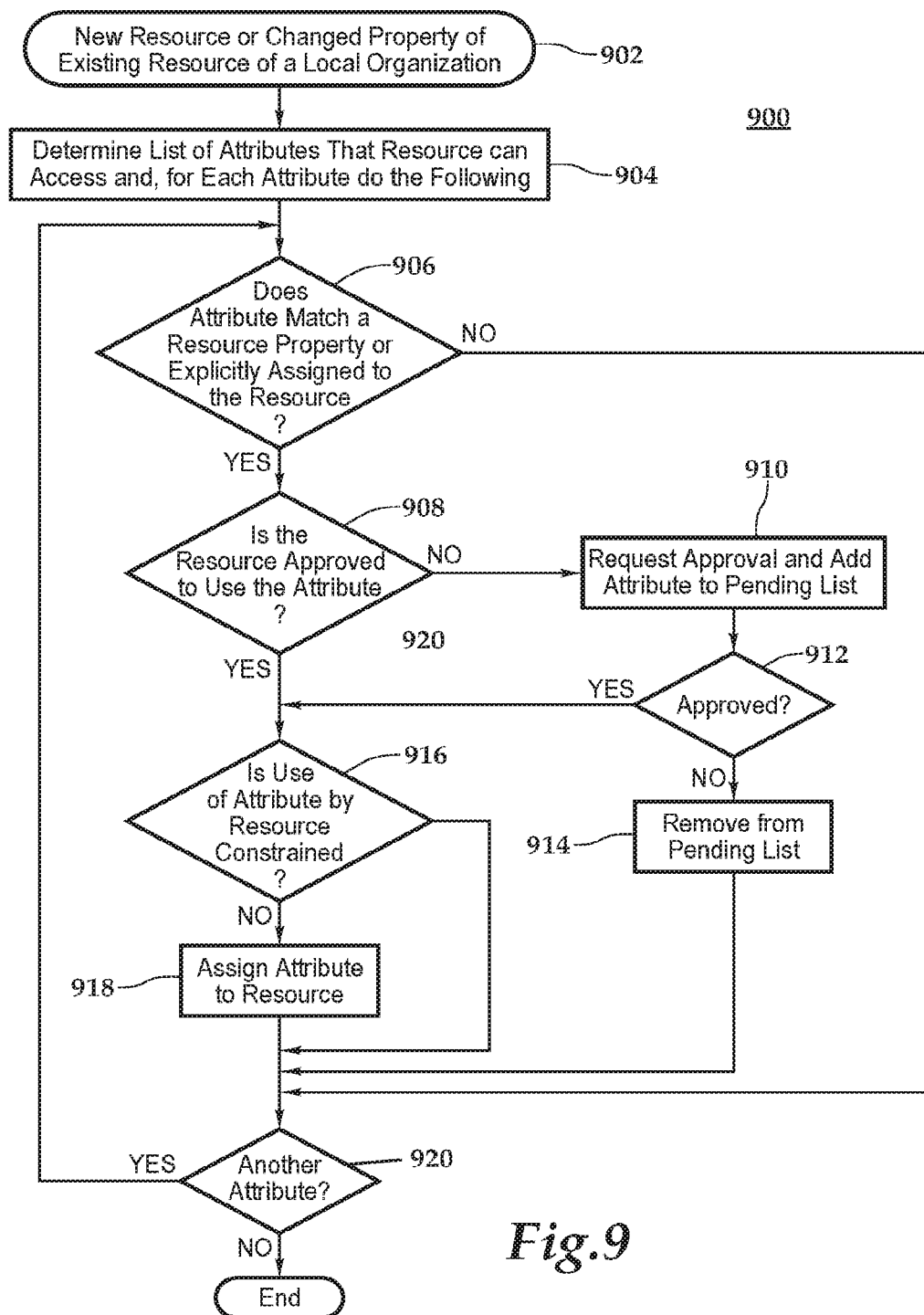
FIG. 9 illustrates a flow chart representing the basic steps of an automated process within computer network security application for assigning an attribute to a resource.
Figure 10:
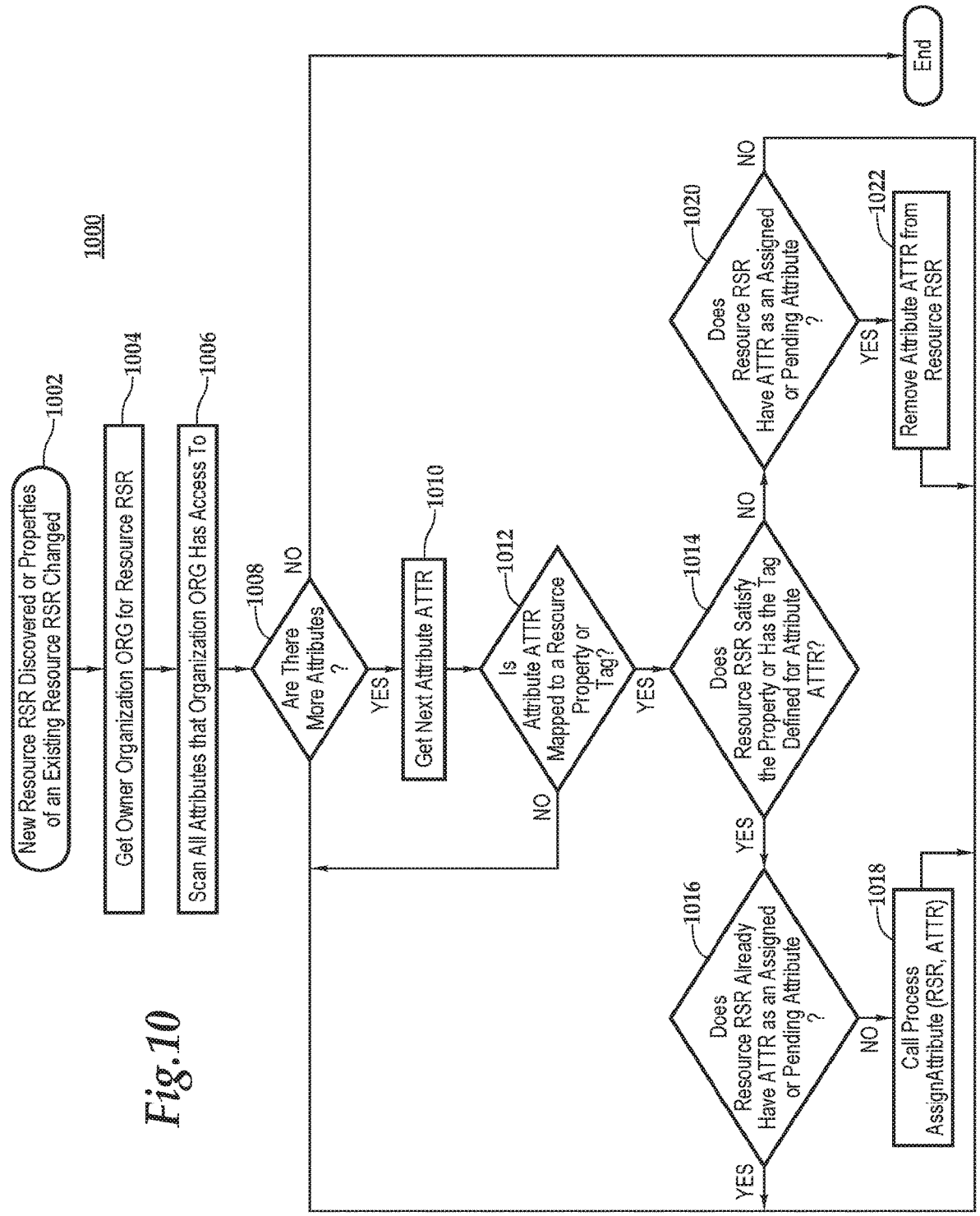
FIG. 10 illustrates a flow chart illustrating the basic steps of automated assignment of tags by a computer network security application based on discovered tags or resource properties.
Figure 12:
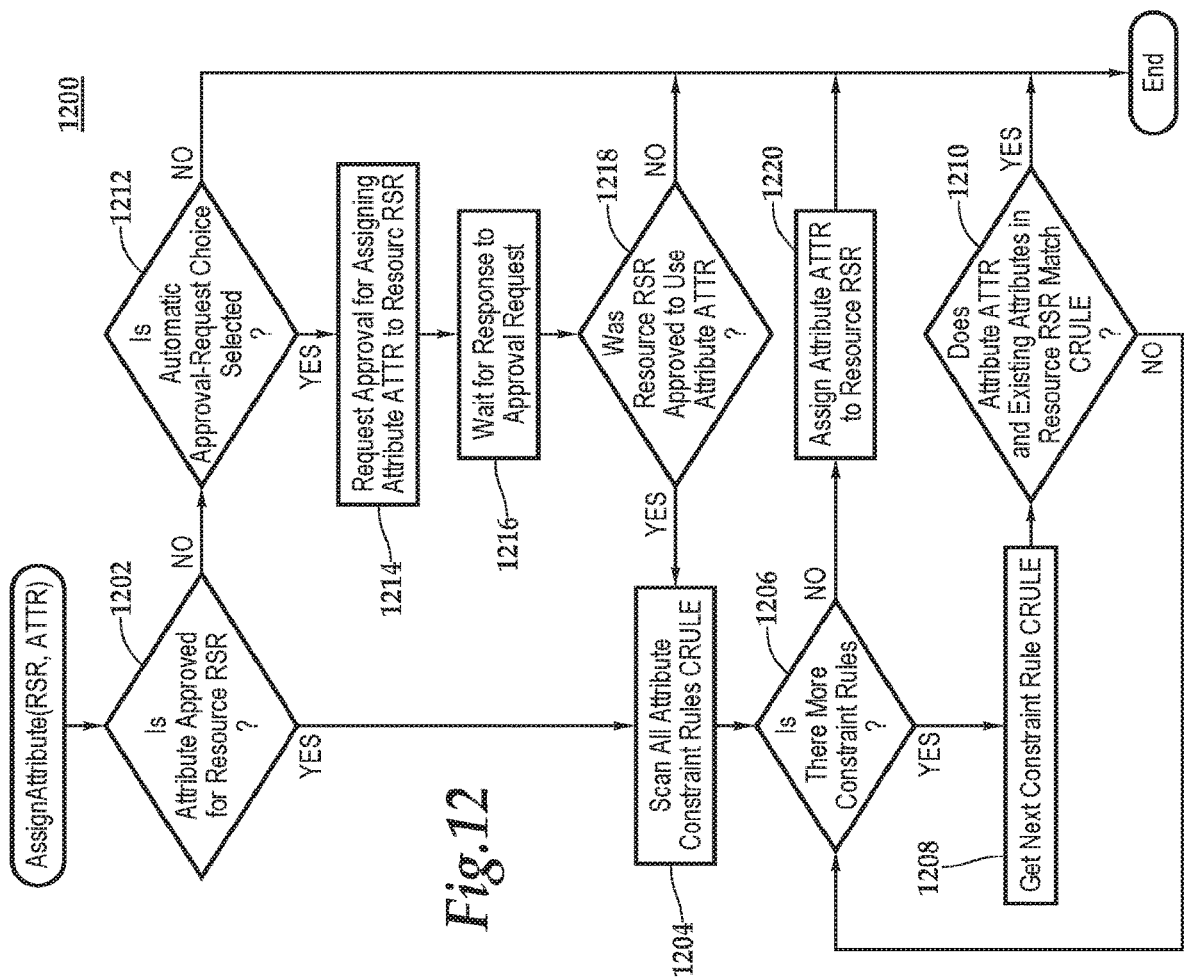
FIG. 12 illustrates a flow chart representing an automated process of the computer network security application for assignment of attributes across organizations (with approval) and constraint on attributes.
Figure 11:
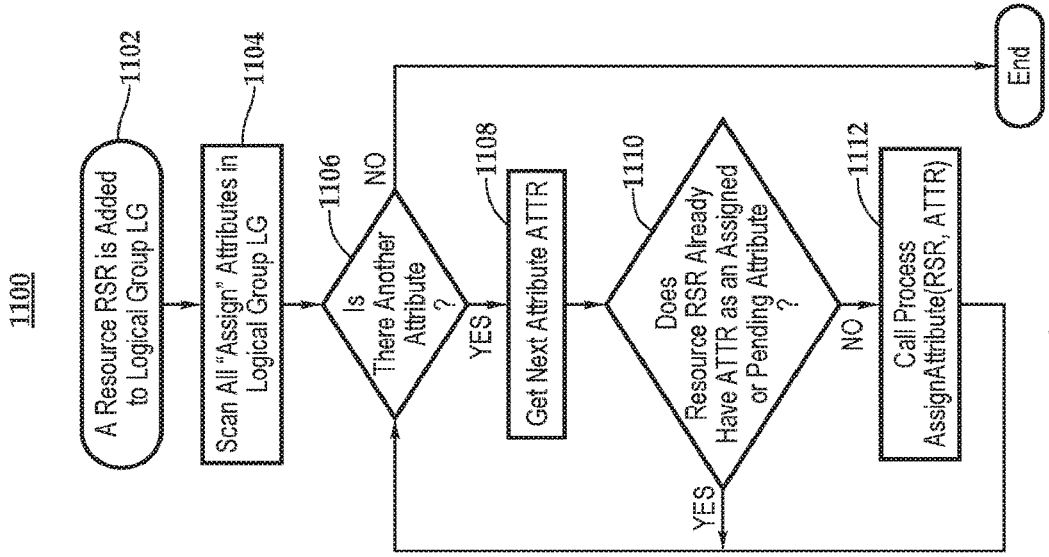
FIG. 11 illustrates a flow chart representing the basic steps of an automated process of the computer network security application for indirect assignment of tags based on logical group membership.

Turning now to FIGS. 9 to 12, these figures processes for implementing an automated mechanism within computer network security application for assigning an attribute to a resource. These processes associate an attribute to a resource by mapping the attribute to infrastructure tags or properties of the resource. The flow chart of FIG. 9 illustrates an overview of the basic steps of the entire process 900, while FIG. 10 to 12 provide additional details of parts of the process.

Referring now to FIG. 9, the computer network security application is able to automatically map an attribute to a resource using a property that an actual infrastructure resource possesses, or an infrastructure tag stored by the infrastructure service provider for that infrastructure resource. When a new resource or a change to the properties of existing resource is discovered by the computer network security application, as represented by block 902, this triggering event or condition causes the process 900 to be performed. Discovery can take place by, for example, the computer network security application identifying, or being notified of, a change in one or more databases storing information on the computer network's infrastructure resources and their properties, or by querying, for example, an infrastructure service provider's API. The computer network security application or other process may construct, add or update the store of infrastructure resources using their properties using any of the methods identified herein, and perform process 900 in response to those actions.

Each attribute in a list of attributes that the resource can access is checked by the computer network security application to verify if any of the properties of the resource match the attribute, as represented by step 904. If an attribute is explicitly assigned to a resource either directly or through membership in logical groups process, as indicated by decision step 906, the attribute is checked to verify if the resource is approved to use the attribute at step 908.

If the resource is not approved to use the attribute, the computer network security application can, at step 910, generate an automated request for approval, depending on a pre-configured choice. If a request is generated and sent, the attribute is added to a pending list for that resource at step 912. If the attribute is not approved, an approval request is not generated and the process ends for that attribute. Although not indicated in the flow chart, the process will repeat, starting with step 906, for the next attribute if there are any remaining attributes to be checked. If a request is generated, the computer network security application then waits for a response for a user assigned the necessary role to approve or deny the request. If the attribute request is denied at step 912, the computer network security application removes attribute from the list of pending attributes at step 914 and the process ends for that attribute.

If the attribute has been previously approved for use with the resource, or if a request for approval is given, the computer security network application checks at step 916 whether the attribute is not allowed by any attribute constraint policy rule, considering the attributes already assigned to the resource. If the attribute is not allowed, then the process ends for that attribute. If the attribute is allowed, then the attribute is assigned to the resource as step 918. As indicated by decision step 920, the process is repeated for each attribute.

FIGS. 10 to 12 describe representative examples of implementations of various steps of process 900.

FIG. 10 illustrates a process 1000 performed by the computer network security application for automatically assigning tags based on discovered tags or resource properties. The process automatically associates an attribute to a resource by mapping the attribute to infrastructure tags or properties learned from a discovered or changed resource. When a new resource is discovered, or when properties of existing resources change, at step 1002 the list of attributes that the resource can access are checked to verify if any of the properties of the resource match the attribute. As indicated by step 1004, the computer network security application obtains the identity of the local organization that owns that resource. The computer software security application scans all attributes to which that particular local organization has access to at step 1006. As indicated by decision step 1008 and step 1010, if there is at least one attribute that the organization has access to, the process gets the first one. It then determines at step 1012 whether the attribute has been mapped to a resource property or tag. A resource property or tag is learned from the infrastructure service provider hosting the resource. Next, as indicated by decision step 1014, the process determines whether the resource satisfies the property or has a tag defined for the attribute. If it does, the process proceeds to determine, as indicated by decision step 1016, whether the resource already has the attribute as an assigned or pending attribute. If it does, the process proceeds to step 1018, where it jumps to an attribute assignment process 1200 that is described in FIG. 12.

If, at decision step 1014, the process determines that the resource does not satisfy the property or does not have a tag defined for the attribute, it proceeds to determine, at step 1020, whether the resource has the attribute assigned to it or has a pending attribute assigned to it. If yes, the process removes assignment of the attribute to the resource at step 1022. If no, the process returns to step 1008 and repeats until all attributes are processed, at which point it ends.

Referring now to FIG. 11, process 1100 sets up the step of indirect assignment of tags based on logical group membership. Process is triggered at step 1102 by the addition of a resource ("RSR") to a logical group ("LG"). At step 1104, the process scans all "assigned" attributes associated with the logical group. If, as indicated by decision step 1106 and step 1108, there is at least one attribute, the next attribute ("ATTR") is obtained, the process determines for that attribute whether the resource already has that attribute is an assigned or pending attribute at decision step 1110. If it does, the process gets the next attribute. Otherwise, the process calls at step 1112 an attribute assignment process 1200.

Referring now to FIG. 12, illustrated are steps of the attribute assignment process 1200 for assigning an attribute to a resource. As indicated by decision step 1202, the process determines whether the attribute is approved for the source. If it is, the process proceeds to applying any attribute constraint rules at step 1204. It scans all of the possibly applicable attribute constraint rules. As indicated by the loop formed by decision step 1206, step 1208 and step 1210, the assignment of the attribute to the resource is checked against each constraint rule ("CRULE"). If the assignment of the attribute to the resource passes all attribute constraint rules, the process proceeds to step 1220 and assigns the attribute to the resource. The process then ends.

If, at step 1202, the attribute is not approved for that resource, process determines, as indicated by decision step 1212, whether the computer network security application is configured for automatic approval requests. If not, attribute assignment process 1200 ends. If it is, the process proceeds to step 1214, where it requests approval for signing the attribute to the resource. It waits at step 1216. If the resource is approved to use the attribute at step 1218, the process proceeds to step 1204, where attribute constraint rules are checked.

Application of Communication Policy Constraint Rules

Referring now to FIGS. 13-16, illustrated are representative processes performed by the computer network security application for checking a local organizations communication policy against communication policy constraints established by the global organization.

Figure 13:
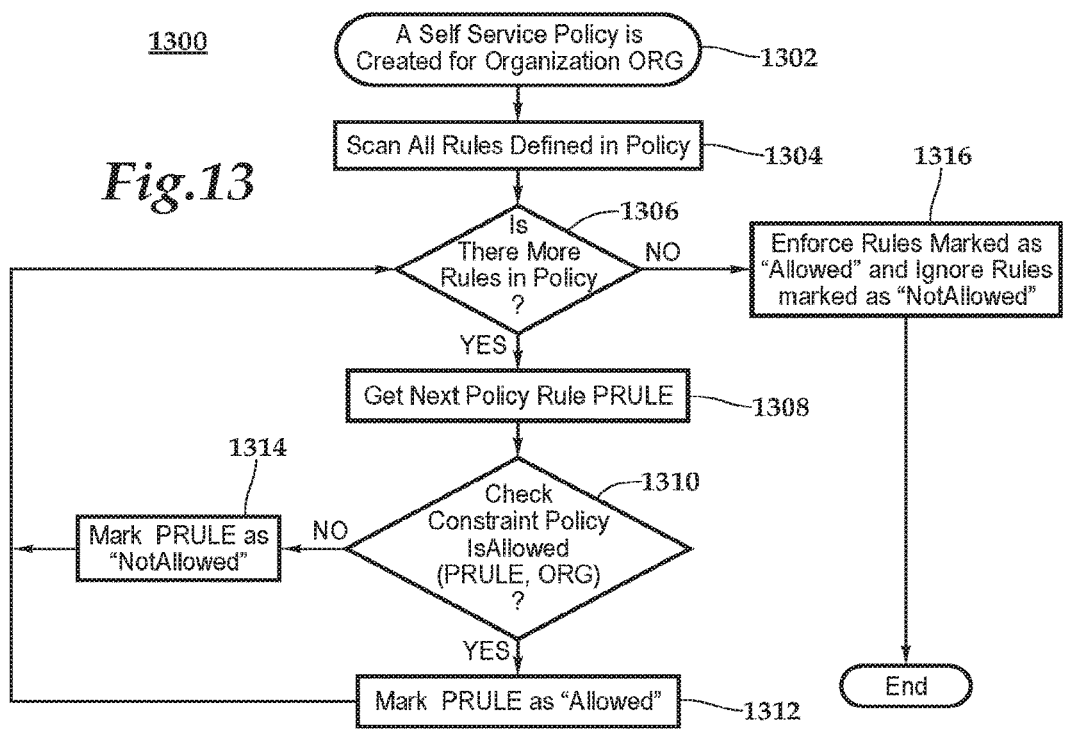
FIG. 13 illustrates a flow chart representing a method for automating a process by the computer network security application for using communication constraint policies to check communication policy rules that might be created by a local organization.

Process 1300 of FIG. 13 represents a basic, top-level process for describing how a constrained policy is used by the computer network security application program to check a "self service" security policy (in this example, a communication policy) created by an organization within an enterprise. As indicated by step 1302, processes triggered by a local organization creating its own communication policy. As indicated by step 1304, the process scans all proposed rules defined within the proposed "self-service" security policy. As represented by decision step 1306 in step 1308, the process checks each proposed rule ("PRULE") in the security policy at step 1310. At step 1310, the computer network security application performs process 1400 shown in FIG. 14 determines whether or not the rule is allowed based on the constraint policies. If the rule is allowed, it is marked as being allowed at step 1312. If it is not allowed, it is marked as being not allowed at step 1314. The computer network security application, as indicated by step 1316, then enforces the rules of the security policy marked as allowed, and it ignores the rules marked as not allowed. Examples of how a computer network security application can deploy or provision, and/or enforce, a communication policy rules described above in connection with FIGS. 1 to 8.

However, the computer network security application can also be used to read security policies already deployed using an infrastructure service provider's native security mechanisms (for example using AWS web console) rather than with the computer network security application. When a native security mechanism is deployed by some other manner, process 1300 does not perform step 1316 and instead stores an indication of which rules do not comply. It may generate one or more messages to alert or notify predetermined users of the computer network security application of the violation of the constraint policies. The users can then, if they desire, handle the violation as desired, such as by removing the security policy, editing the security policy for compliance, removing the non-compliant rule, or allowing the non-compliant rule to remain.

Figure 14:
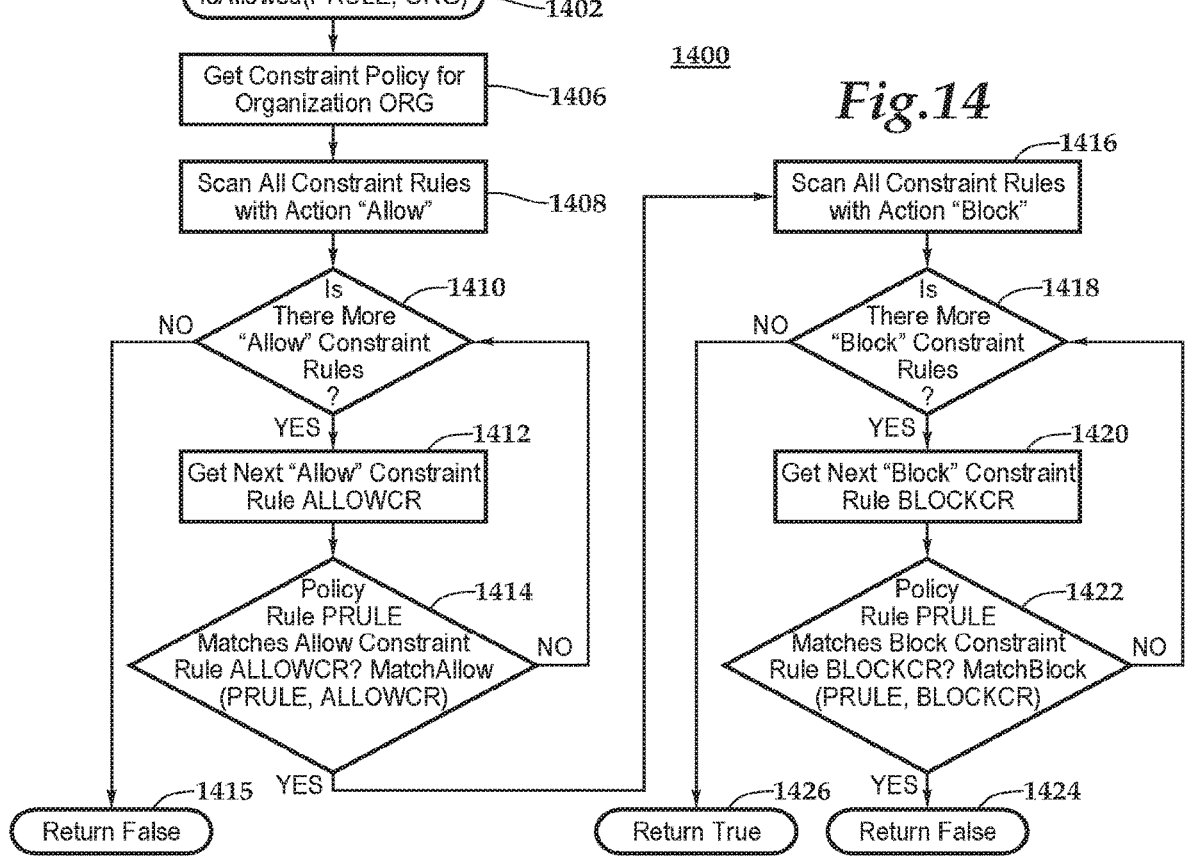
FIG. 14 illustrates a flow chart for a sub-process of FIG. 13, representing a method for automated checking of a single communication policy rule against communication constraint policies.
Figure 15:
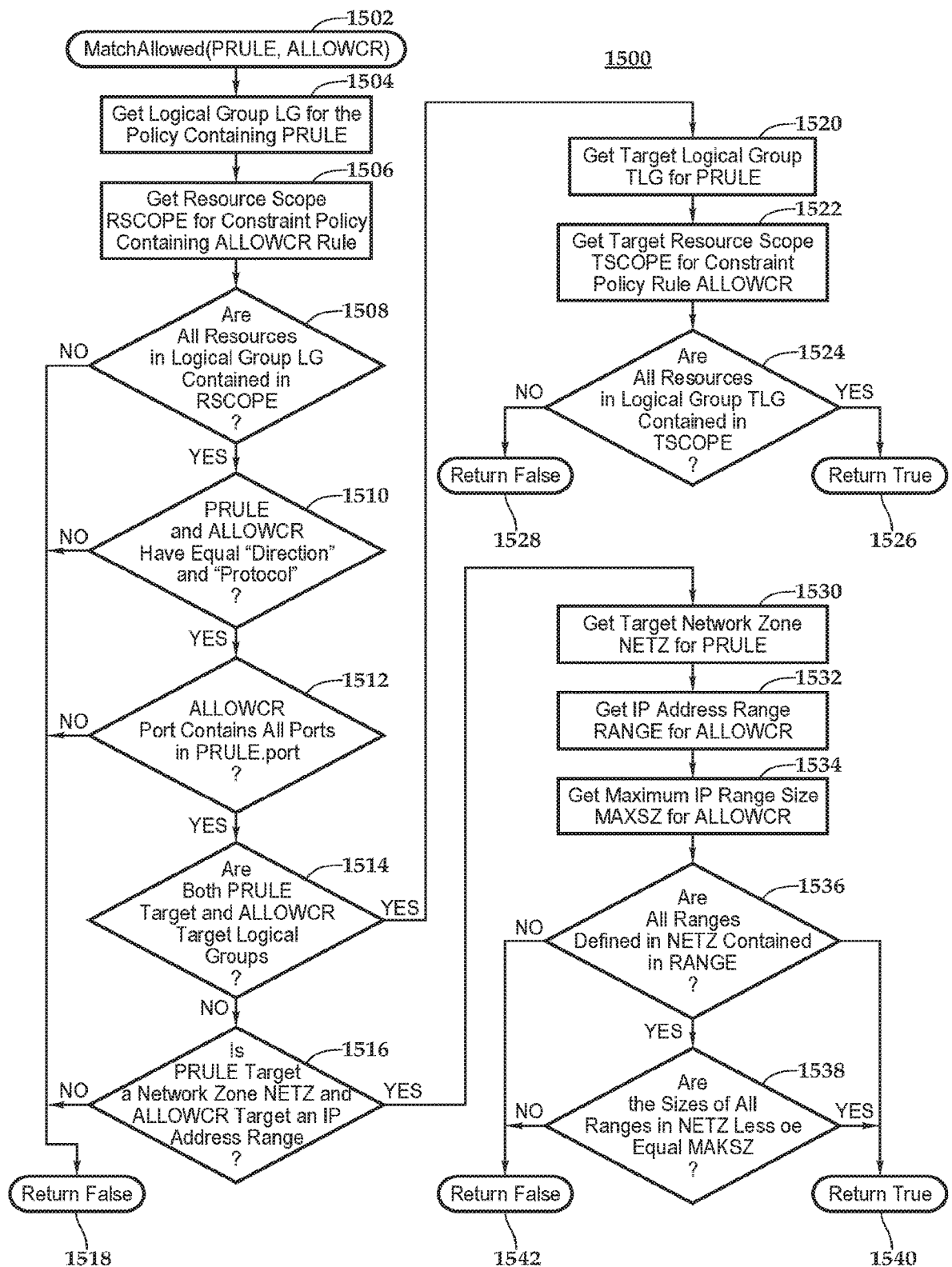
FIG. 15 illustrates a flow chart of a sub-process for use as part of the processes of FIGS. 13 and 14, for enabling the computer network security application to check matching of an "allow" constraint rule with a communication policy that may be created by a local organization.

Referring now to FIG. 14, the process 1400 is a representative example of a process for determining whether a communication policy rule is allowed using a constraint policy applicable to a local organization. This process is applied at steps 1310 in process 1300. When the process is starts at step 1402, the process gets at step 1406 the constraint policy for the local organization creating the communications policy containing that rule. The process scans, at step 1408, all constraint rules within the constraint policy obtained at step 1406 with an "allow" action. As indicated by decision step 1410, step 1412, and step 1414, for each "allow" constraint rule ("ALLOWCR") rule matching process is carried out until there is a match with an "allow" constraint rule, at which point the process continues to step 1416. Process 1500, shown in FIG. 15, is an example of such a rule matching process. If the "allow" constraint rule is matched, the process 1500 returns a true. If the process returns a "false," the process returns to step 1410, where the next "allow" constraint rule is obtained and checked at step 1414 for a match. If none of the "allow" constraint rules are a match, the process returns as step 1415 a "false" to step 1310 of process 1300 and stops.

If the communication policy rule matches any of the "allow" constraint rules, process 1400 moves to step 1416 to check the communication policy rule against all "block" constraint rules. At step 1416, the process scans all constraint rules with the action "block." As indicated by decision step 1418, step 1420 and decision step 1422, the process does loop for each "block" constraint rule ("BLOCKCR") to check the communication policy rule against each "block" constraint rule using a matching process, an example of which is process 1600 of FIG. 16, until there is a constraint rule that is matched or there are no more constraint rules. If a "block" constraint rules is matched, the process moves to step 1424 and returns a "false." Otherwise, as indicated by step 1426, the process returns a "true." The process 1300 uses the returned value at step 1310.

Referring now to FIG. 15, which illustrates the "allow" communication constraint rule matching process 1500, once the process starts at step 1502, it gets at step 1504 a logical group for the communication policy for the communication policy rule being matched. Then, at step 1506, they get the resource scope ("RSCOPE") for the communication constraint policy containing the "allow" communication constraint rules. Then, as represented by decision steps 1508, 1510, and 1512, the process checks whether all the resources in logical group contained in the resource scope, whether the proposed communications policy rule being checked have the same direction and protocol as indicated in the communication constraint rule, and whether the "allow" communication policy constraint rule contains all of the ports in the proposed communication policy rule ("PRULE.port") being checked. If the answer to any of the questions is negative, meaning that the proposed communications policy rule does not fit within these parameters in the communications constraint policy rule, the process returns a false at step 1518.

At steps 1514 and 1516, process 1500 determines which of two branches to follow. First, if at decision step 1514, the process determines that the target of the proposed communication policy rule and the target in the "allow" communication policy constraint rule are logical groups, the process branches to the process starting with step 1520. At step 1520 and 1522, the process gets the target logical groups ("TLG") for the proposed communication policy rule and the target resource scope ("TSCOPE") for the "allow" communication constraint policy rule. If the process determines at decision step 1524 all the resources in the logical group are contained in the target resource group of the "allow" communication constrain policy rule, the process returns a "true" at step 1526, meaning that there is a match. Otherwise it returns at step 1528 a "false."

However, if the process determines at step 1514 that the target of the proposed communication policy rule and the target in the "allow" communication policy constraint rule are not both logical groups, the process checks the decision at step 1516 whether the target of the proposed communication policy rule is a network zone and the target of the in the "allow" communications constraint rule is a IP address range. If either are not, the process returns a "false" at step 1518. If they both are, the process proceeds to steps 1530 and 1532. At these steps the process obtains the target network zone ("NETZ") for the proposed communication policy constraint rule, and the IP address range ("RANGE") for the "allow" communication policy constraint rule. Furthermore, at step 1534, the process gets the maximum IP range size ("MAXSZ") for the "allow" communication policy constraint rule. At step 1536, process determines whether the range of IP addresses contained in the network zone for the proposed communication policy rule is contained within the IP address range for the "allow" communication policy constraint rule. If it is, the process then checks at decision step 1538 whether the sizes of each of the ranges in the target network zones for the proposed communication policy rule are less than or equal to the maximum IP range size specified in the "allow" communication policy constraint rule. If so, the process returns at step 1540 a "true." Otherwise, the process returns at step 1542 a "false."

Figure 16:
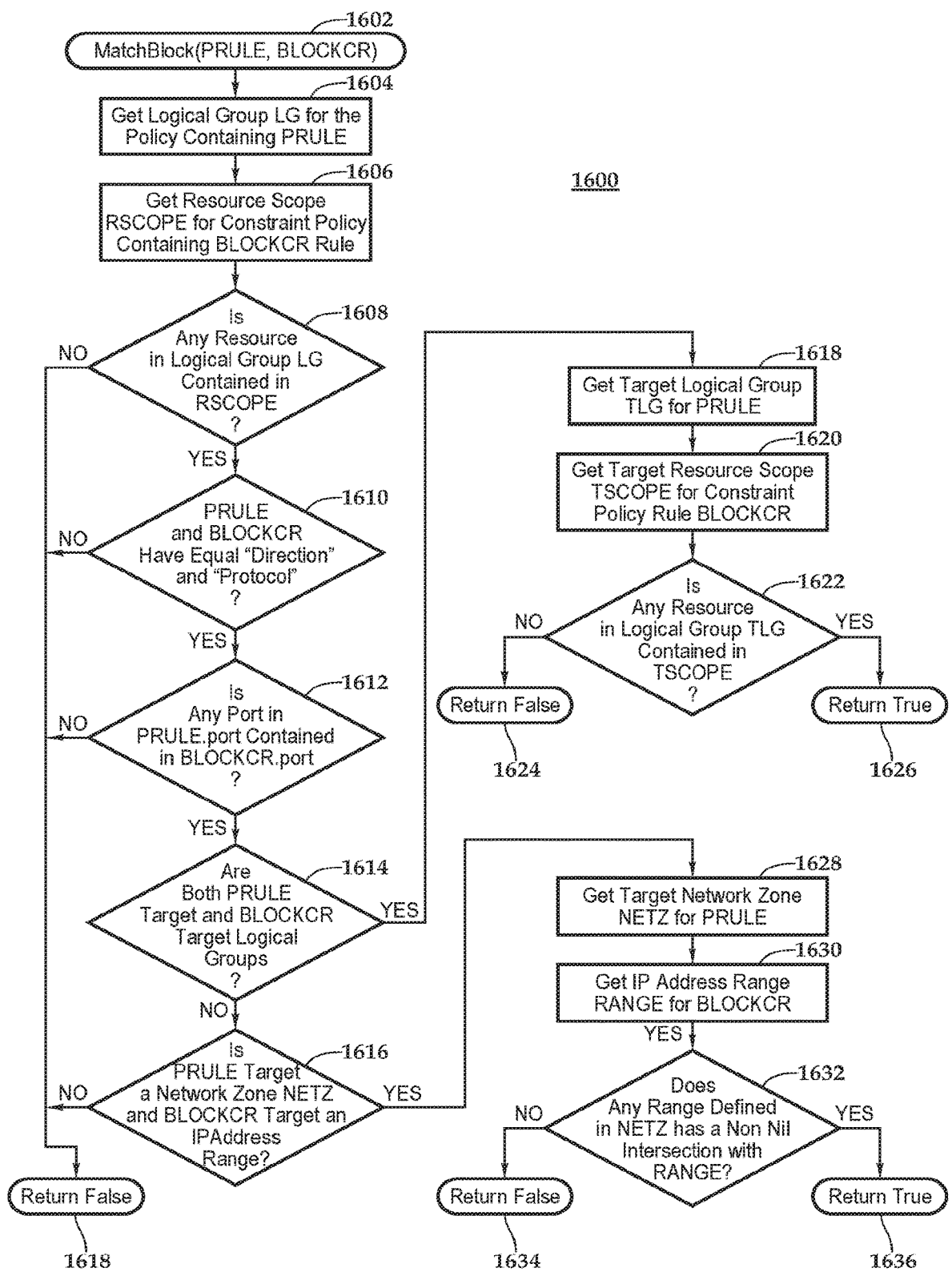
FIG. 16 illustrates a flow chart of a sub-process for is as part of the processes of FIGS. 13 and 14, illustrate a method for enabling the computer network security application to perform a process for automatically matching a "block" constraint rule with a policy rule.

Turning now FIG. 16, process 1600 illustrates the basic steps of an example of a process for matching a particular "block" communication constraint rule with a proposed communication policy rule. This process, or sub-process, may be used at step 1422 in process 1400 shown in FIG. 14. Process 1600 starts at step 1602, when it is called or invoked. Like the process 1500 shown in FIG. 15, process 1600 checks whether certain parameters of the proposed communication policy rule are consistent with, or match, the parameters contained in the communication constraint policy rule. At step 1604, it gets the logical group ("LG") for the policy containing the proposed communication policy rule that is being evaluated. It also gets, at step 1606, the resource scope ("RSCOPE") for the communication constraint policy containing the "block" communication constraint policy rule ("BLOCKCR") that is being applied during the matching process. As indicated by step 1608, the process then determines whether any resource within the logical group is contained in the resource scope. If not, the process returns "false" at step 1618. A "false" return means that the proposed communication policy rule is not blocked by the communication policy constraint rule being evaluated. Otherwise, the process proceeds to check whether both the proposed communication policy rule and the communication constraint rule match in terms of direction and protocol at step 1610. If these do not match, the process returns "false" at step 1618. Otherwise, at step 1612, the checks whether any port in the proposed communications policy rule matches a port, or is within a range of ports ("BLOCKCR.port"), specified by the "block" communications policy constraint rule. Again, if there is no match, the process returns a "false" at step 1618.

The process then determines at step 1614 whether target specified by both the proposed communication policy rule and "block" communication policy constraint rule are both logical groups. If not, the process proceeds to decision step 1616. Otherwise, the process gets at step 1618 the target logical group ("TLG") for the proposed communication policy rule and gets at step 1620 the target resource scope ("TSCOPE") for the "block" communication policy constraint rule. The process evaluates at step 1622 whether any resource in the logical group for the proposed communication policy rule is contained within the target resource scope of the "block" communication policy constraint rule. If not, the process returns a "false" at step 1624. Otherwise, the process returns a "true" at step 1626, which indicates that the proposed communication policy rule is blocked by the communication policy constraint rule.

If, at step 1614 the process decides that both the proposed communication policy rule and the "block" communication policy constraint rule do not have logical groups as targets, it proceeds to step 1616 determine whether the proposed communication policy rule has a target network zone and the "block" communication policy constraint rule specifies in IP address range. If not, there is no match, and the process returns a "false" at step 1618. Otherwise, the process continues at steps 1628 and 1630 to get the target network zone ("NETZ") for the proposed medication policy rule and the IP address range ("RANGE") for the "block" communication policy constraint rule. At step 1632, the process evaluates whether any range defined in the target network zone of the proposed communication policy rule has any overlap with the IP address range of the communication policy constraint rule. If not, the block rule is not matched, and the process returns a "false" at step 1634. Otherwise, the communication policy constraint rule is matched, and the process returns a "true" at step 1636.

The following is an example of a typical use case of local organizations in a large enterprise. This is just one way that local organizations can be used, but not the only one. Different enterprises can use organizations in many other different ways. In a typical deployment, the enterprise may create a global organization to host global policies to be used across the enterprise, and have many local organizations associated with different groups in the enterprise, such as lines of business, departments, and/or projects.

Global security administrators can then be given access to all organizations, including the global organization and can be assigned permission to do the following global tasks: create and delete organizations; create global attributes and make them public for global use, or export them to specific organizations that need to use them; create global policies and make them available across the organizations through public or exported attributes; pre-approve usage of public or exported attributes by others or all organizations; approve or deny request to use public/exported attributes not pre-approved; define global communication constraint policies and assign them to the organizations, limiting the policies that can be created by the organizations assigned to specific line of business or departments; and define attribute constraint rules for global and exported attributes.

A local organization associated with a particular line of business or department can assign policies to its resources using one of the following methods. First, it may select a global policy available to the organization through public or exported attributes. In this case the organization cannot modify the policy and can only use policies that are pre-defined. It may also create its own policies, in which case the local organization can create its own specific policies, but these policies must be allowed by constraints defined by the global organization.

The foregoing description is of representative examples apparatus and processes that implement various features. The invention is defined by the appended claims and is not limited to details of the representative implementations described above. Alterations and modifications to the examples can be made without departing from the invention as defined by the claims. The meaning of the terms used in this specification are, unless expressly stated otherwise, intended to have ordinary and customary meaning to someone of ordinary skill in the pertinent field, and are not intended to be limited to the details of the structures and processes given as examples.

What is claimed is:

1. At least one non-transitory machine-readable medium comprising instructions that, when executed, cause at least one processor to at least:
   assign a first attribute to respective ones of a plurality of infrastructure resources of an infrastructure service provider in response to a determination that the infrastructure resource satisfies a resource property, the satisfaction of the resource property determined based on whether the infrastructure resource is constrained by a constraint rule, the first attribute being mapped to a property of the infrastructure service provider, the first attribute including a key and value pair; and
   generate a configuration for an infrastructure resource based on a plurality of security policies and the assignment of the first attribute to the infrastructure resource.

2. The at least one non-transitory machine-readable medium of claim 1, wherein the instructions cause the at least one processor to assign the first attribute based on an infrastructure tag provided by the infrastructure service provider for the infrastructure resource.

3. The at least one non-transitory machine-readable medium of claim 1, wherein the instructions cause the at least one processor to assign a second attribute based on a property of the infrastructure resource.

4. The at least one non-transitory machine-readable medium of claim 1, wherein the instructions cause the at least one processor to assign the first attribute to the infrastructure resource based on membership in at least one logical group.

5. The at least one non-transitory machine-readable medium of claim 1, wherein the configuration is based on the plurality of security policies defined for a logical group and attributes of the infrastructure resources that are members of the logical group.

6. The at least one non-transitory machine-readable medium of claim 1, wherein the instructions cause the at least one processor to request permission for the infrastructure resource to use the first attribute.

7. The at least one non-transitory machine-readable medium of claim 1, wherein each of the plurality of security policies specifies a plurality of rules specified with logical objects.

8. An apparatus comprising:
   memory;
   machine-readable instructions;
   logic circuitry to execute the machine-readable instructions that cause the logic circuitry to at least:
      assign a first attribute to respective ones of a plurality of infrastructure resources of an infrastructure service provider in response to a determination that the infrastructure resource satisfies a resource property, the satisfaction of the resource property determined based on whether the infrastructure resource is constrained by a constraint rule, the first attribute being mapped to a property of the infrastructure service provider, the first attribute including a key and value pair; and
      generate a configuration for an infrastructure resource based on a plurality of security policies and the assignment of the first attribute to the infrastructure resource.

9. The apparatus of claim 8, wherein the logic circuitry is to assign the first attribute based on an infrastructure tag provided by the infrastructure service provider for the infrastructure resource.

10. The apparatus of claim 8, wherein the logic circuitry is to assign a second attribute based on a property of the infrastructure resource.

11. The apparatus of claim 8, wherein the logic circuitry is to assign the first attribute to the infrastructure resource based on membership in at least one logical group.

12. The apparatus of claim 8, wherein the configuration is based on the security policies defined for a logical group and attributes of the infrastructure resources that are members of the logical group.

13. The apparatus of claim 8, wherein the logic circuitry is to request permission for the infrastructure resource to use the first attribute.

14. The apparatus of claim 8, wherein each of the security policies is to specify a plurality of rules specified with logical objects.

15. A method comprising:
assigning a first attribute to respective ones of a plurality of infrastructure resources of an infrastructure service provider in response to a determination that the infrastructure resource satisfies a resource property, the satisfaction of the resource property determined based on whether the infrastructure resource is constrained by a constraint rule, the first attribute being mapped to a property of the infrastructure service provider, the first attribute including a key and value pair; and
generating, by executing an instruction with at least one processor, a configuration for an infrastructure resource based on a plurality of security policies and the assignment of the first attribute to the infrastructure resource.

16. The method of claim 15, wherein the assigning of the first attribute is based on an infrastructure tag provided by the infrastructure service provider for the infrastructure resource.

17. The method of claim 15, wherein the assigning of a second attribute is based on a property of the infrastructure resource.

18. The method of claim 15, wherein the assigning of the first attribute to the infrastructure resource is based on membership in at least one logical group.

* * * * *